US012627576B1

(12) United States Patent
Sandlerman et al.

(10) Patent No.: US 12,627,576 B1
(45) Date of Patent: May 12, 2026

(54) SYSTEM, METHOD, AND COMPUTER PROGRAM FOR MANAGING FAULT RECOVERY IN NETWORK FUNCTION VIRTUALIZATION (NFV) BASED NETWORKS

(71) Applicant: Amdocs Development Limited, Limassol (CY)

(72) Inventors: Nimrod Sandlerman, Ramat Gan (IL); Ofer Hermoni, Tenafly, NJ (US); Eyal Felstaine, Herzliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 425 days.

(21) Appl. No.: 17/941,949

(22) Filed: Sep. 9, 2022

Related U.S. Application Data

(63) Continuation of application No. 16/790,981, filed on Feb. 14, 2020, now Pat. No. 11,474,918, which is a continuation of application No. 15/586,087, filed on May 3, 2017, now Pat. No. 10,606,718, which is a continuation-in-part of application No. 14/572,726, filed on Dec. 16, 2014, now Pat. No. 9,645,899, said application No. 15/586,087 is a continuation of application No. 15/166,186, filed on May 26, 2016, now Pat. No. 10,355,988, which is a continuation of application No. 14/572,716, filed on Dec. 16, 2014, now Pat. No. 9,384,028, said application No. 15/586,087 is a continuation-in-part of application No. 15/225,737, filed on Aug. 20, 2016, now Pat. No. 10,063,633, which is a continuation of application No. 14/752,719, filed on Dec. 16, 2014, now Pat. No. 9,430,262, said application No. 15/586,087 is a continuation-in-part of application No. 15/268,427, filed on Sep. 16, 2016, now Pat. No. 9,912,679, which (Continued)

(51) Int. Cl.
H04L 41/40 (2022.01)
H04L 41/0659 (2022.01)

(52) U.S. Cl.
CPC .......... *H04L 41/40* (2022.05); *H04L 41/0661* (2023.05)

(58) Field of Classification Search
None
See application file for complete search history.

(56) References Cited

U.S. PATENT DOCUMENTS

| | | | |
|---|---|---|---|
| 6,249,883 B1 * | 6/2001 | Cassidy | G06F 11/008 714/48 |
| 2015/0160961 A1 * | 6/2015 | Johnson | G06F 9/45558 718/1 |
| 2020/0127881 A1 * | 4/2020 | Kempe | H04L 41/40 |

* cited by examiner

*Primary Examiner* — Anh Nguyen
(74) *Attorney, Agent, or Firm* — Zilka-Kotab, P.C.

(57) ABSTRACT

According to one aspect of the present invention there is provided a system, method, and computer program product for recovering from a network failure in a communication network using network function virtualization (NFV-based network), the method including: selecting a first network component of the NFV-based network, detecting at least one probable failure of the first network component, selecting a second network component to be used for replacing the instance of the VNF in the first network component prior to a failure of the first network component, and securing at least one resource of the selected second network component for the other instance of the VNF and maintaining, in the selected second network component, an updated copy of data associated with the instance of the VNF in the first network component.

19 Claims, 11 Drawing Sheets

Related U.S. Application Data is a continuation of application No. 14/752,723, filed on Dec. 16, 2014, now Pat. No. 9,460,286, said application No. 15/586,087 is a continuation-in-part of application No. 14/673,587, filed on Mar. 30, 2015, now Pat. No. 9,760,923, and a continuation-in-part of application No. 14/673,602, filed on Mar. 30, 2015, now Pat. No. 11,537,978, and a continuation-in-part of application No. 14/593,505, filed on Jan. 9, 2015, now Pat. No. 10,027,569, and a continuation-in-part of application No. 14/593,538, filed on Jan. 9, 2015, now Pat. No. 10,063,453, and a continuation-in-part of application No. 14/572,728, filed on Dec. 16, 2014, now Pat. No. 9,806,979, and a continuation-in-part of application No. 14/561,126, filed on Dec. 4, 2014, now Pat. No. 9,813,335, and a continuation-in-part of application No. 14/538,731, filed on Nov. 11, 2014, now Pat. No. 9,853,914, and a continuation-in-part of application No. 14/572,729, filed on Dec. 16, 2014, now Pat. No. 9,838,265, and a continuation-in-part of application No. 14/819,263, filed on Aug. 5, 2015, now Pat. No. 10,164,944, and a continuation-in-part of application No. 14/538,754, filed on Nov. 11, 2014, now Pat. No. 9,749,218, and a continuation-in-part of application No. 14/625,596, filed on Feb. 18, 2015, now Pat. No. 9,882,828, and a continuation-in-part of application No. 14/631,707, filed on Feb. 25, 2015, now abandoned, and a continuation-in-part of application No. 14/606,991, filed on Jan. 27, 2015, now Pat. No. 9,755,934, and a continuation-in-part of application No. 14/606,999, filed on Jan. 27, 2015, now Pat. No. 9,853,869, and a continuation-in-part of application No. 14/605,856, filed on Jan. 26, 2015, now Pat. No. 9,667,509, and a continuation-in-part of application No. 14/597,165, filed on Jan. 14, 2015, now Pat. No. 9,794,160, and a continuation-in-part of application No. 14/572,732, filed on Dec. 16, 2014, now Pat. No. 9,760,428, and a continuation-in-part of application No. 14/572,735, filed on Dec. 16, 2014, now Pat. No. 9,794,187, and a continuation-in-part of application No. 15/275,189, filed on Sep. 23, 2016, now Pat. No. 10,162,725, and a continuation-in-part of application No. 14/977,489, filed on Dec. 21, 2015, now Pat. No. 10,764,323, and a continuation-in-part of application No. 14/940,083, filed on Nov. 20, 2015, now Pat. No. 9,992,221, and a continuation-in-part of application No. 15/081,746, filed on Mar. 25, 2016, now Pat. No. 10,064,167, and a continuation-in-part of application No. 15/007,076, filed on Jan. 26, 2016, now Pat. No. 10,291,543, and a continuation-in-part of application No. 15/331,724, filed on Oct. 21, 2016, now Pat. No. 10,387,183, and a continuation-in-part of application No. 15/083,150, filed on Mar. 28, 2016, now Pat. No. 10,116,514, and a continuation-in-part of application No. 15/222,844, filed on Jul. 28, 2016, now Pat. No. 10,069,694, said application No. 16/790,981 is a continuation-in-part of application No. 15/841,123, filed on Dec. 13, 2017, now abandoned, and a continuation-in-part of application No. 15/981,804, filed on May 16, 2018, now Pat. No. 11,271,948, and a continuation-in-part of application No. 15/672,068, filed on Aug. 8, 2017, now Pat. No. 10,700,946, and a continuation-in-part of application No. 16/044,442, filed on Jul. 24, 2018, now Pat. No. 10,749,905, and a continuation-in-part of application No. 16/287,922, filed on Feb. 27, 2019, now Pat. No. 10,936,721, and a continuation-in-part of application No. 16/280,245, filed on Feb. 20, 2019, now Pat. No. 10,880,182, and a continuation-in-part of application No. 16/280,259, filed on Feb. 20, 2019, now Pat. No. 11,044,153, and a continuation-in-part of application No. 16/280,265, filed on Feb. 20, 2019, now Pat. No. 11,327,805, and a continuation-in-part of application No. 16/280,272, filed on Feb. 20, 2019, now Pat. No. 11,153,333, and a continuation-in-part of application No. 16/280,279, filed on Feb. 20, 2019, now Pat. No. 11,044,146, and a continuation-in-part of application No. 16/280,286, filed on Feb. 20, 2019, now Pat. No. 11,095,533, and a continuation-in-part of application No. 16/280,301, filed on Feb. 20, 2019, now Pat. No. 11,330,004, and a continuation-in-part of application No. 16/453,584, filed on Jun. 26, 2019, now Pat. No. 11,403,544, and a continuation-in-part of application No. 16/280,310, filed on Feb. 20, 2019, now Pat. No. 10,764,150, and a continuation-in-part of application No. 16/280,312, filed on Feb. 20, 2019, now Pat. No. 10,951,485, and a continuation-in-part of application No. 16/280,320, filed on Feb. 20, 2019, now Pat. No. 11,153,177, and a continuation-in-part of application No. 16/280,353, filed on Feb. 20, 2019, now Pat. No. 10,972,345, and a continuation-in-part of application No. 16/280,367, filed on Feb. 20, 2019, now Pat. No. 11,271,822, and a continuation-in-part of application No. 16/280,246, filed on Feb. 20, 2019, now Pat. No. 10,897,400, and a continuation-in-part of application No. 16/280,260, filed on Feb. 20, 2019, now Pat. No. 10,846,141, and a continuation-in-part of application No. 16/280,386, filed on Feb. 20, 2019, now Pat. No. 10,756,970, and a continuation-in-part of application No. 16/290,773, filed on Mar. 1, 2019, now abandoned, and a continuation of application No. 16/280,513, filed on Feb. 20, 2019, now Pat. No. 10,880,185, and a continuation-in-part of application No. 16/280,634, filed on Feb. 20, 2019, now Pat. No. 10,938,650, and a continuation-in-part of application No. 16/255,609, filed on Jan. 23, 2019, now Pat. No. 11,568,280, and a continuation-in-part of application No. 16/255,635, filed on Jan. 23, 2019, now abandoned, and a continuation-in-part of application No. 16/290,779, filed on Mar. 1, 2019, now abandoned, and a continuation-in-part of application No. 16/782,906, filed on Feb. 5, 2020, now abandoned, and a continuation-in-part of application No. 16/782,934, filed on Feb. 5, 2020, now abandoned, and a continuation-in-part of application No. 16/782,956, filed on Feb. 5, 2020, now abandoned.

(60) Provisional application No. 62/690,290, filed on Jun. 26, 2018, provisional application No. 62/660,142, filed on Apr. 19, 2018, provisional application No. 62/648,281, filed on Mar. 26, 2018, provisional application No. 62/648,287, filed on Mar. 26, 2018, provisional application No. 62/642,524, filed on Mar. 13, 2018, provisional application No. 62/639,910, filed on Mar. 7, 2018, provisional application No. 62/639,913, filed on Mar. 7, 2018, provisional application No. 62/639,923, filed on Mar. 7, 2018, provisional application No. 62/637,337, filed on Mar. 1, 2018, provisional application No. 62/539,362, filed on Jul. 31, 2017, provisional application No. 62/509,623, filed on May 22, 2017, provisional application No. 62/447,855, filed on Jan. 18, 2017, provisional application No. 62/244,674, filed on Oct. 21, 2015, provisional application No. 62/140,353, filed on Mar. 30, 2015, provisional application No. 62/138,897, filed on Mar. 26, 2015, provisional application No. 62/107,943, filed on Jan. 26, 2015, provisional application No. 62/078,365, filed on Nov. 11, 2014, provisional application No. 62/034,715, filed on Aug. 7, 2014, provisional application No. 62/034,721, filed on Aug. 7, 2014, provisional application No. 62/033,606, filed on Aug. 5, 2014, provisional application No. 62/033,615, filed on Aug. 5, 2014, provisional application No. 62/027,709, filed on Jul. 22, 2014, provisional application No. 62/026,508, filed on Jul. 18, 2014, provisional application No. 62/026,512, filed on Jul. 18, 2014, provisional application No. 62/020,939, filed on Jul. 3, 2014, provisional application No. 62/013,997, filed on Jun. 18, 2014, provisional application No. 62/014,005, filed on Jun. 18, 2014, provisional application No. 61/981,116, filed on Apr. 17, 2014, provisional application No. 61/941,380, filed on Feb. 18, 2014, provisional application No. 61/918,597, filed on Dec. 19, 2013.

411

412

445 — SERVICE PLANNING

NORTHBOUN SERVICE APIS

446 — EAST / WEST EAST APIS

447

ORCHESTRATION & WORKFLOW MANAGEMENT

432

444 SECURITY MANAGEMENT

443 FAULT RECOVERY

BIG DATA ANALYTICS — 440

442 ACCOUNTING & LICENSING

437 POLICY MANAGEMENT

ADMIN TOOL — 438

ASSURANCE — 436

SERVICE MANAGEMENT — 452

433 DEPLOYMENT OPTIMIZATION

CHAIN OPTIMIZATION — 434

435 SERVICE FULFILLMENT (ORDER TO ACTIVATION)

ORDER DECOMPOSITION

ACTIVATION & PROVISIONING

NON FUNCTIONAL

439 INVENTORY

ASSIGNED PRODUCT

ASSIGNED SERVICE

SERVICE INVENTORY

ASSIGNED RESOURCE

441 CATALOGS

PRODUCT

SERVICE

VNFD

RESOURCE

448 — SOUTHNOUND APIS (EMS & INTRA – CMS AND DSN)

450 — NFV APPLICATIONS

APPLICATION 1  APPLICATION 2  APPLICATION 3  •••  APPLICATION N

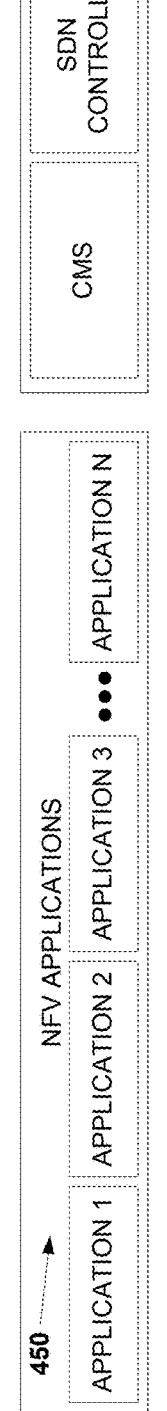

CMS

SDN CONTROLLER

IDENTIFY FAULTY UNIT — 80

IDENTIFY FAULT — 81

LOAD FAULT RECOVERY PLAN — 82

DETERMINE AFFECTED VMFS — 83

MIGRATE AFFECTED VMF TO BACKUP UNIT — 84

ALL VMFS MIGRATED — 85

NO

REPORT — 86

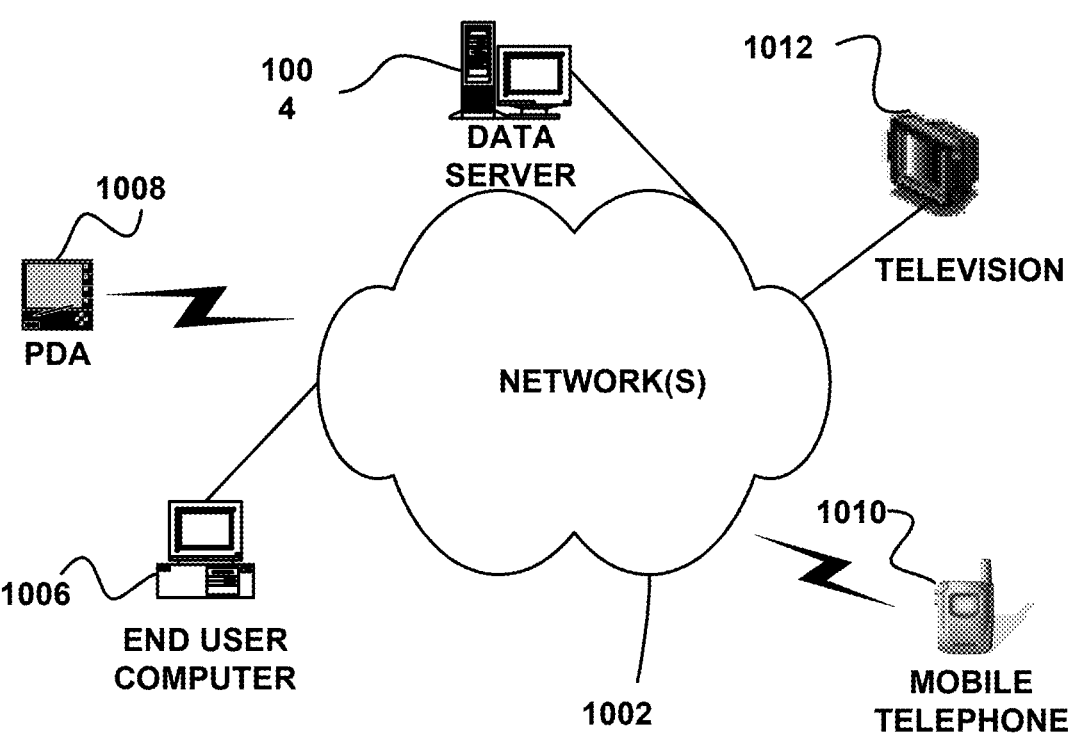
100
4
DATA
SERVER
1012
TELEVISION
1008
PDA
NETWORK(S)
1006
END USER
COMPUTER
1002
1010
MOBILE
TELEPHONE
1000
FIGURE 10

SYSTEM, METHOD, AND COMPUTER PROGRAM FOR MANAGING FAULT RECOVERY IN NETWORK FUNCTION VIRTUALIZATION (NFV) BASED NETWORKS

CLAIM OF PRIORITY AND RELATED APPLICATIONS

The present application is a continuation of, and claims priority to, U.S. patent application Ser. No. 16/790,981 (AMDCP540A*KA/1043A+), entitled "SYSTEM, METHOD, AND COMPUTER PROGRAM FOR MANAGING FAULT RECOVERY IN NETWORK FUNCTION VIRTUALIZATION (NFV) BASED NETWORKS," filed Feb. 14, 2020, which in turn is a continuation of, and claims priority to, U.S. patent application Ser. No. 15/586,087 (AMDCP540*KA/1043A), entitled "SYSTEM, METHOD, AND COMPUTER PROGRAM FOR MANAGING FAULT RECOVERY IN NETWORK FUNCTION VIRTU-ALIZATION (NFV) BASED NETWORKS," filed May 3, 2017, both of which are incorporated herein by reference in their entirety.

U.S. patent application Ser. No. 15/586,087 (AMDCP540*KA/1043A) is a continuation-in-part of, and claims priority to, U.S. patent application Ser. No. 14/572,726 (AMDCP369), entitled "System, Method, And Computer Program For Managing Fault Recovery In Network Function Virtualization (Nfv) Based Networks," filed Dec. 16, 2014, now U.S. Pat. No. 9,645,899 issued May 9, 2017, which in turn claims priority to and the benefit of U.S. Provisional Application No. 61/918,597 (AMDCP323+), entitled "System, Method, And Computer Program For Preserving Service Continuity In Network Function Virtu-alization (Nfv)-Based Networks," filed Dec. 19, 2013; U.S. Provisional Application No. 61/941,380 (AMDCP338+), entitled "System, Method, And Computer Program For Managing Hierarchy And Optimization In Network Func-tion Virtualization (Nfv)-Based Networks," filed Feb. 18, 2014; U.S. Provisional Application No. 61/981,116 (AMDCP355+), entitled "System, Method, And Computer Program For Managing Security In A Network Based On Network Function Virtualization (Nfv)," filed Apr. 17, 2014; U.S. Provisional Application No. 62/026,508 (AMDCP369+), entitled "System, Method, And Computer Program For Managing Fault Recovery In Network Func-tion Virtualization (Nfv) Based Networks," filed Jul. 18, 2014; and U.S. Provisional Application No. 62/026,512 (AMDCP370+), entitled "System, Method, And Computer Program For Optimizing A Chain Of Virtual Network Func-tions In A Network Based On Network Function Virtualiza-tion (Nfv)," filed Jul. 18, 2014. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 15/166,186 (AMDCP323A), entitled "System, Method, And Computer Program For Preserving Service Continuity In A Network Function Virtualization (Nfv) Based Communication Net-work," filed May 26, 2016, now U.S. Pat. No. 10,355,988 issued Jul. 16, 2019, which in turns claims priority to U.S. patent application Ser. No. 14/572,716, (AMDCP323), entitled "System, Method, And Computer Program For Preserving Service Continuity In A Network Function Vir-tualization (Nfv) Based Communication Network," filed Dec. 16, 2014, now U.S. Pat. No. 9,384,028 issued Jul. 5, 2016, which in turn claims priority to U.S. Provisional Patent Application No. 61/918,597 (AMDCP323+), entitled "System, Method, And Computer Program For Preserving Service Continuity In Network Function Virtualization (Nfv)-Based Networks," filed Dec. 19, 2013. The foregoing applications and/or patents are herein incorporated by ref-erence in their entirety for all purposes.

Additionally, U.S. patent application Ser. No. 15/586,087 (AMDCP540*KA) is a continuation-in-part of, and claims priority to, U.S. patent application Ser. No. 15/225,737 (AMDCP338A), entitled "System, Method, And Computer Program For Managing Hierarchy And Optimization In A Network Function Virtualization (Nfv) Based Communica-tion Network," filed Aug. 1, 2016, now U.S. Pat. No. 10,063,633 issued Aug. 28, 2018, which in turns claims priority to U.S. patent application Ser. No. 14/572,719 (AMDCP338), entitled "System, Method, And Computer Program For Managing Hierarchy And Optimization In A Network Function Virtualization (Nfv) Based Communica-tion Network," filed Dec. 16, 2014, now U.S. Pat. No. 9,430,262 issued Aug. 30, 2016, which in turn claims priority to U.S. Provisional Patent Application No. 61/941, 380 (AMDCP338+), entitled "System, Method, And Com-puter Program For Managing Hierarchy And Optimization In Network Function Virtualization (Nfv)-Based Networks," filed Feb. 18, 2014; U.S. Provisional Patent Application No. 61/918,597 (AMDCP323+), entitled "System, Method, And Computer Program For Preserving Service Continuity In Network Function Virtualization (Nfv)-Based Networks," filed Dec. 19, 2013. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 15/268,427 (AMDCP355A), entitled "System, Method, And Computer Program For Managing Security In A Network Function Virtualization (Nfv) Based Communication Network," filed Sep. 16, 2016, now U.S. Pat. No. 9,912,679 issued Mar. 6, 2018, which in turns claims priority to U.S. patent applica-tion Ser. No. 14/572,723, now U.S. Pat. No. 9,460,286 (AMDCP355), entitled "System, Method, And Computer Program For Managing Security In A Network Function Virtualization (Nfv) Based Communication Network," filed Dec. 16, 2014, issued Oct. 4, 2016, which in turn claims priority to U.S. Provisional Patent Application No. 62/027, 709 (AMDCP376+), entitled "System, Method, And Com-puter Program For Inter-Module Communication In A Net-work Based On Network Function Virtualization (Nfv)," filed Jul. 22, 2014; U.S. Provisional Patent Application No. 62/026,508 (AMDCP369+), entitled "System, Method, And Computer Program For Managing Fault Recovery In Net-work Function Virtualization (Nfv) Based Networks," filed Jul. 18, 2014; U.S. Provisional Patent Application No. 61/981,116 (AMDCP355+), entitled "System, Method, And Computer Program For Managing Security In a Network Based On Network Function Virtualization (Nfv)," filed Apr. 17, 2014; U.S. Provisional Patent Application No. 61/941, 380 (AMDCP338+), entitled "System, Method, And Com-puter Program For Managing Hierarchy And Optimization In Network Function Virtualization (Nfv)-Based Networks," filed Feb. 18, 2014; U.S. Provisional Patent Application No. 61/918,597 (AMDCP323+), entitled "System, Method, And Computer Program For Preserving Service Continuity In Network Function Virtualization (Nfv)-Based Networks,"

filed Dec. 19, 2013. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/673,587 (AMDCP361), entitled "System, Method, And Computer Program For Service Design And Creation," filed Mar. 30, 2015, now U.S. Pat. No. 9,760,923 issued Sep. 12, 2017, which in turn claims priority to U.S. Provisional Patent Application No. 62/020,939 (AMDCP361A+), entitled "System, Method, And Computer Program For Service Design And Creation," filed Jul. 3, 2014; U.S. Provisional Patent Application No. 62/013,997 (AMDCP361+), entitled "System, Method, And Computer Program For Service Design And Creation," filed Jun. 18, 2014. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/673,602 (AMDCP362), entitled "System, Method, And Computer Program For Inventory Management Utilizing An Inventory And Topology Module Including A Plurality Of Layers," filed Mar. 30, 2015, which in turn claims priority to U.S. Provisional Patent Application No. 62/014,005 (AMDCP362+), entitled "System, Method, And Computer Program For Inventory Management Utilizing An Inventory And Topology Module Including A Plurality Of Layers," filed Jun. 18, 2014. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/593,505 (AMDCP367), entitled "System, Method, And Computer Program For Testing Virtual Services," filed Jan. 9, 2015, now U.S. Pat. No. 10,027,569 issued Jul. 17, 2018, which in turn claims priority to U.S. Provisional Patent Application No. 62/034,715 (AMDCP367+), entitled "System, Method, And Computer Program For Testing Virtual Services," filed Aug. 7, 2014. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/593,538 (AMDCP368), entitled "System, Method, And Computer Program For Tag Based Testing Of Virtual Services," filed Jan. 9, 2015, now U.S. Pat. No. 10,063,453 issued Aug. 28, 2018, which in turn claims priority to U.S. Provisional Patent Application No. 62/034,721 (AMDCP368+), entitled "System, Method, And Computer Program For Tag Based Testing of Virtual Services," filed Aug. 7, 2014. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/572,728 (AMDCP370), entitled "System, Method, And Computer Program For Optimizing A Chain Of Virtual Network Functions In A Network Based On Network Function Virtualization (Nfv)," filed Dec. 16, 2014, now U.S. Pat. No. 9,806, 979 issued Oct. 31, 2017, which in turn claims priority to U.S. Provisional Patent Application No. 62/026,508 (AMDCP369+), entitled "System, Method, And Computer Program For Managing Fault Recovery In Network Function Virtualization (Nfv) Based Networks," filed Jul. 18, 2014; U.S. Provisional Patent Application No. 62/026,512 (AMDCP370+), entitled "System, Method, And Computer Program For Optimizing A Chain Of Virtual Network Functions In A Network Based On Network Function Virtualization (Nfv)," filed Jul. 18, 2014; U.S. Provisional Patent Application No. 61/981,116 (AMDCP355+), entitled "System, Method, And Computer Program For Managing Security In a Network Based On Network Function Virtualization (Nfv)," filed Apr. 17, 2014; U.S. Provisional Patent Application No. 61/941,380 (AMDCP338+), entitled "System, Method, And Computer Program For Managing Hierarchy And Optimization In Network Function Virtualization (Nfv)-Based Networks," filed Feb. 18, 2014; U.S. Provisional Patent Application No. 61/918,597 (AMDCP323+), entitled "System, Method, And Computer Program For Preserving Service Continuity In Network Function Virtualization (Nfv)-Based Networks," filed Dec. 19, 2013. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/561,126 (AMDCP374), entitled "System, Method, And Computer Program For Augmenting A Physical System Utilizing A Network Function Virtualization Orchestrator (Nfv-O)," filed Dec. 4, 2014, now U.S. Pat. No. 9,813,335 issued Nov. 7, 2017, which in turn claims priority to U.S. Provisional Patent Application No. 62/033,606 (AMDCP374+), entitled "System, Method, And Computer Program For Augmenting A Physical System Utilizing A Network Function Virtualization Orchestrator (Nfv-O)," filed Aug. 5, 2014. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/538,731 (AMDCP375), entitled "System, Method, And Computer Program For Selecting At Least One New Physical Element And/Or Virtual Element For Use In A System Including A Network Function Virtualization Orchestrator (Nfv-O)," filed Nov. 11, 2014, now U.S. Pat. No. 9,853,914 issued Dec. 26, 2017. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/572,729 (AMDCP376), entitled "System, Method, And Computer Program For Inter-Module Communication In A Network Based On Network Function Virtualization (Nfv)," filed Dec. 16, 2014, now U.S. Pat. No. 9,838,265 issued Dec. 5, 2017, which in turn claims priority to U.S. Provisional Patent Application No. 62/027,709 (AMDCP376+), entitled "System, Method, And Computer Program For Inter-Module Communication In A Network Based On Network Function Virtualization (Nfv)," filed Jul. 22, 2014; U.S. Provisional Patent Application No. 62/026,508 (AMDCP369+), entitled "System, Method, And Computer Program For Managing Fault Recovery In Network Function Virtualization (Nfv) Based Networks," filed Jul. 18, 2014; U.S. Provisional Patent Application No. 62/026,512 (AMDCP370+), entitled "System, Method, And Computer Program For Optimizing A Chain Of Virtual Network Functions In A Network Based On Network Function Virtualization (Nfv)," filed Jul. 18, 2014; U.S. Provisional Patent Application No. 61/981,116 (AMDCP355+), entitled "System, Method, And Computer Program For Managing Security In A Network Based On Network Function Virtualization (Nfv)," filed Apr. 17, 2014; U.S. Provisional Patent Application No. 61/941,380 (AMDCP338+), entitled "System, Method, And Computer Program For Managing Hierarchy And Optimization In Network Function Virtualization (Nfv)-Based Networks," filed Feb. 18, 2014; U.S. Provisional Patent Application No. 61/918,597 (AMDCP323+), entitled "System, Method, And Computer Program For Preserving Service Continuity In Network Function Virtualization (Nfv)-Based Networks," filed Dec. 19, 2013. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/819,263 (AMDCP378), entitled "System, Method, And Computer Program For Implementing A Virtual Obfuscation Service In A Network," filed Aug. 5, 2015, now U.S. Pat. No. 10,164,944 issued Dec. 25, 2018, which in turn claims priority to U.S. Provisional Patent Application No. 62/033,615 (AMDCP378+), entitled "System, Method, And Computer Program For Implementing A Virtual Obfuscation Service In A Network," filed Aug. 5, 2014. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/538,754 (AMDCP384), entitled "System, Method, And Computer Program For Routing Traffic To A Service In A Network Including At Least One Virtual Network Service," filed Nov. 11, 2014, now U.S. Pat. No. 9,749,218 issued Aug. 29, 2017. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/625,596 (AMDCP385), entitled "System, Method, And Computer Program For Planning Distribution Of Network Resources In A Network Function Virtualization (Nfv) Based Communication Network," filed Feb. 18, 2015, now U.S. Pat. No. 9,882,828 issued Jan. 30, 2018, which in turn claims priority to U.S. Provisional Patent Application No. 62/078,365 (AMDCP385+), entitled "System, Method, And Computer Program For Planning Distribution Of Network Resources In A Network Function Virtualization (Nfv) Based Communication Network," filed Nov. 11, 2014. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/631,707 (AMDCP403), entitled "System, Method, And Computer Program For Automatically Configuring Network Function Virtualization Based (Nfv-Based) Components Based On A Predicted Optimum Capacity Requirement," filed Feb. 25, 2015. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/606,991 (AMDCP411), entitled "System, Method, And Computer Program For Testing At Least A Portion Of A Network Function Virtualization Based (Nfv-Based) Communication Network Utilizing At Least One Virtual Service Testing Element," filed Jan. 27, 2015, now U.S. Pat. No. 9,755,934 issued Sep. 5, 2017. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/606,999 (AMDCP412), entitled "System, Method, And Computer Program For Automatically Instructing A Virtual Network Function (Vnf) To Operate In Accordance With One Of A Plurality Of Function Definitions," filed Jan. 27, 2015, now U.S. Pat. No. 9,853,869 issued Dec. 26, 2017. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/605,856 (AMDCP421), entitled "System, Method, And Computer Program For Secluding A Service In A Network Based On Network Function Virtualization (Nfv)," filed Jan. 26, 2015, now U.S. Pat. No. 9,667,509 issued May 30, 2017. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/597,165 (AMDCP423), entitled "System, Method, And Computer Program For Testing Composite Services In A Communication Network Utilizing Test Data," filed Jan. 14, 2015, now U.S. Pat. No. 9,794,160 issued Oct. 17, 2017. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/572,732 (AMDCP426), entitled "System, Method, And Computer Program For Performing Preventative Maintenance In A Network Function Virtualization (Nfv) Based Communication Network," filed Dec. 16, 2014, now U.S. Pat. No. 9,760,428 issued Sep. 12, 2017, which in turn claims priority to U.S. Provisional Patent Application No. 62/027,709 (AMDCP376+), entitled "System, Method, And Computer Program For Inter-Module Communication In A Network Based On Network Function Virtualization (Nfv)," filed Jul. 22, 2014; U.S. Provisional Patent Application No. 62/026,508 (AMDCP369+), entitled "System, Method, And Computer Program For Managing Fault Recovery In Network Function Virtualization (Nfv) Based Networks," filed Jul. 18, 2014; U.S. Provisional Patent Application No. 62/026,512 (AMDCP370+), entitled "System, Method, And Computer Program For Optimizing A Chain Of Virtual Network Functions In A Network Based On Network Function Virtualization (Nfv)," filed Jul. 18, 2014; U.S. Provisional Patent Application No. 61/981,116 (AMDCP355+), entitled "System, Method, And Computer Program For Managing Security In A Network Based On Network Function Virtualization (Nfv)," filed Apr. 17, 2014; U.S. Provisional Patent Application No. 61/941,380 (AMDCP338+), entitled "System, Method, And Computer Program For Managing Hierarchy And Optimization In Network Function Virtualization (Nfv)-Based Networks," filed Feb. 18, 2014; U.S. Provisional Patent Application No. 61/918,597 (AMDCP323+), entitled "System, Method, And Computer Program For Preserving Service Continuity In Network Function Virtualization (Nfv)-Based Networks," filed Dec. 19, 2013. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/572,735 (AMDCP427/1005A), entitled "System, Method, And Computer Program For Resource Conversion In A Network Function Virtualization (Nfv) Based Communication Network," filed Dec. 16, 2014, now U.S. Pat. No. 9,794,187 issued Oct. 17, 2017, which in turn claims priority to U.S. Provisional Patent Application No. 61/941,380 (AMDCP338+), entitled "System, Method, And Computer Program For Managing Hierarchy And Optimization In Network Function Virtualization (Nfv)-Based Networks," filed Feb. 18, 2014; U.S. Provisional Patent Application No. 61/918,597 (AMDCP323+), entitled "System, Method, And Computer Program For Preserving Service Continuity In Network Function Virtualization (Nfv)-Based Networks," filed Dec. 19, 2013. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 15/275,189 (AMDCP431), entitled "System, Method, And Computer Program For Providing Feedback Indicating An Impact Of User Directives On A Software System," filed Sep. 23, 2016, now U.S. Pat. No. 10,162,725 issued Dec. 25, 2018. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/977,489 (AMDCP433), entitled "System, Method, And Computer Program For Isolating Services Of A Communication Network In Response To A Distributed Denial Of Service (Ddos) Attack," filed Dec. 21, 2015. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 14/940,083 (AMDCP434), entitled "System, Method, And Computer Program For Utilizing A Decoy In Response To A Distributed Denial Of Service (Ddos) Attack In A Communication Network," filed Nov. 12, 2015, now U.S. Pat. No. 9,992,221 issued Jun. 5, 2018. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 15/081,746 (AMDCP435), entitled "System, Method, And Computer Program For Coordinating A Plurality Of Networks Based On Network Function Virtualization (Nfv)," filed Mar. 25, 2016, now U.S. Pat. No. 10,064,167 issued Aug. 28, 2018, which in turn claims priority to U.S. Provisional Patent Application No. 62/138,897 (AMDCP435+), entitled "System, Method, And Computer Program For Coordinating A Plurality Of Networks Based On Network Function Virtualization (Nfv)," filed Mar. 26, 2015. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 15/007,076 (AMDCP440), entitled "System, Method, And Computer Program For Defragmenting A Network Based On Network Function Virtualization (Nfv)," filed Jan. 26, 2016, now U.S.

Pat. No. 10,291,543 issued May 14, 2019, which in turn claims priority to U.S. Provisional Patent Application No. 62/107,943 (AMDCP440+), entitled "System, Method, And Computer Program For Defragmenting A Network Based On Network Function Virtualization (Nfv)," filed Jan. 26, 2015. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 15/331,724 (AMDCP446), entitled "System, Method, And Computer Program For Reducing Common Work Of Components In A Network Function Virtualization (Nfv) Based Communication Network," filed Oct. 21, 2016, now U.S. Pat. No. 10,387,183 issued Aug. 20, 2019, which in turn claims priority to U.S. Provisional Patent Application No. 62/244, 674 (AMDCP446+), entitled "System, Method, And Computer Program For Reducing Common Work Of Components In A Network Function Virtualization (Nfv) Based Communication Network," filed Oct. 21, 2015. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 15/083,150 (AMDCP450), entitled "System, Method, And Computer Program For Deploying Orchestration Layer For A Network Based On Network Function Virtualization (Nfv)," filed Mar. 28, 2016, now U.S. Pat. No. 10,116,514 issued Oct. 30, 2018, which in turn claims priority to U.S. Provisional Patent Application No. 62/140,353 (AMDCP450+), entitled "System, Method, And Computer Program For Deploying Orchestration Layer For A Network Based On Network Function Virtualization (Nfv)," filed Mar. 30, 2015. The foregoing applications and/or patents are herein incorporated by reference in their entirety for all purposes.

Additionally, U.S. patent application Ser. No. 15/586,087 (AMDCP540*KA) is a continuation-in-part of, and claims priority to, U.S. patent application Ser. No. 15/222,844 (AMDCP517), entitled "System, Method, And Computer Program For Automatically Certifying A Virtual Network Function (Vnf) For Use In A Network Function Virtualization (Nfv) Based Communication Network," filed Jul. 28, 2016, now U.S. Pat. No. 10,069,694 issued Sep. 4, 2018. The foregoing applications and/or patents are herein incorporated by reference in their entirety for all purposes.

Additionally, U.S. patent application Ser. No. 15/586,087 (AMDCP540*KA) claims priority to U.S. Provisional Patent Application No. 62/447,855 (AMDCP538+), entitled "SYSTEM, METHOD, AND COMPUTER PROGRAM FOR CALCULATING A COST-OF-OWNERSHIP FOR VIRTUAL NETWORK FUNCTIONS (VNFS) IN A NETWORK FUNCTION VIRTUALIZATION (NFV) BASED COMMUNICATION NETWORK," filed Jan. 18, 2017. The foregoing applications and/or patents are herein incorporated by reference in their entirety for all purposes.

This application is a continuation-in-part of, and claims priority to, U.S. patent application Ser. No. 15/841,123 (AMDCP538), entitled "SYSTEM, METHOD, AND COMPUTER PROGRAM FOR CALCULATING A COST-OF-OWNERSHIP FOR VIRTUAL NETWORK FUNCTIONS (VNFS) IN A NETWORK FUNCTION VIRTUALIZATION (NFV) BASED COMMUNICATION NETWORK," filed Dec. 13, 2017, which in turn claims priority to U.S. Provisional Patent Application No. 62/447,855 (AMDCP538+), entitled "SYSTEM, METHOD, AND COMPUTER PROGRAM FOR CALCULATING A COST- OF-OWNERSHIP FOR VIRTUAL NETWORK FUNC-
TIONS (VNFS) IN A NETWORK FUNCTION VIRTUAL-
IZATION (NFV) BASED COMMUNICATION
NETWORK," filed Jan. 18, 2017. The foregoing applica-
tions and/or patents are herein incorporated by reference in
their entirety for all purposes.

This application is a continuation-in-part of, and claims
priority to, U.S. patent application Ser. No. 15/981,804
(AMDCP550), entitled "SYSTEM, METHOD, AND COM-
PUTER PROGRAM FOR VERIFYING VIRTUAL NET-
WORK FUNCTION (VNF) PACKAGE AND/OR NET-
WORK SERVICE DEFINITION INTEGRITY," filed May
16, 2018, which in turn is claims priority to U.S. Provisional
Patent Application No. 62/509,623 (AMDCP550+), entitled
"SYSTEM, METHOD, AND COMPUTER PROGRAM
FOR VERIFYING VIRTUAL NETWORK FUNCTION
(VNF) INTEGRITY," filed May 22, 2017. The foregoing
applications and/or patents are herein incorporated by ref-
erence in their entirety for all purposes.

This application is a continuation-in-part of, and claims
priority to, U.S. patent application Ser. No. 15/672,068
(AMDCP559), entitled "SYSTEM, METHOD, AND COM-
PUTER PROGRAM FOR AUTOMATICALLY CERTIFY-
ING A VIRTUAL NETWORK FUNCTION (VNF) FOR
USE IN A NETWORK FUNCTION," filed Aug. 8, 2017,
which is incorporated herein by reference in its entirety.

This application is a continuation-in-part of, and claims
priority to, U.S. patent application Ser. No. 16/044,442
(AMDCP561), entitled "SYSTEM, METHOD, AND COM-
PUTER PROGRAM PROVIDING SECURITY IN NET-
WORK FUNCTION VIRTUALIZATION (NFV) BASED
COMMUNICATION NETWORKS AND SOFTWARE
DEFINED NETWORKS (SDNS)," filed Jul. 24, 2018,
which in turn claims priority to U.S. Provisional Patent
Application No. 62/539,362 (AMDCP561+), entitled "SYS-
TEM, METHOD, AND COMPUTER PROGRAM FOR
PROVIDING SECURITY IN A NETWORK FUNCTION
VIRTUALIZATION (NFV) BASED COMMUNICATION
NETWORK," filed Jul. 31, 2017. The foregoing applica-
tions and/or patents are herein incorporated by reference in
their entirety for all purposes.

This application is a continuation-in-part of, and claims
priority to, U.S. patent application Ser. No. 16/287,922
(AMDCP594), entitled "SYSTEM, METHOD, AND COM-
PUTER PROGRAM FOR SPLITTING AND DISTRIBUT-
ING A PRIVILEGED SOFTWARE COMPONENT INTO
DEPENDENT COMPONENTS IN ORDER TO DELIVER
BETTER SECURITY," filed Feb. 27, 2019, which in turn
claims priority to U.S. Provisional Patent Application No.
62/637,337 (AMDCP594+), entitled "SYSTEM,
METHOD, AND COMPUTER PROGRAM FOR SPLIT-
TING AND DISTRIBUTING A PRIVILEGED SOFT-
WARE COMPONENT INTO DEPENDENT COMPO-
NENTS IN ORDER TO DELIVER BETTER SECURITY,"
filed Mar. 1, 2018. The foregoing applications and/or patents
are herein incorporated by reference in their entirety for all
purposes.

This application is a continuation-in-part of, and claims
priority to, U.S. patent application Ser. No. 16/280,245
(AMDCP596), entitled "SYSTEM, METHOD, AND COM-
PUTER PROGRAM FOR IMPLEMENTING PRUNING
RULES IN AN ARTIFICIAL INTELLIGENCE (AI)
BASED NETWORK MANAGEMENT SYSTEM," filed
Feb. 20, 2019, which in turn claims priority to U.S. Provi-
sional Patent Application No. 62/639,910 (AMDCP596+),
entitled "SYSTEM, METHOD, AND COMPUTER PRO-
GRAM FOR IMPLEMENTING PRUNING RULES IN AN ARTIFICIAL INTELLIGENCE (AI) BASED NETWORK
MANAGEMENT SYSTEM," filed Mar. 7, 2018. The fore-
going applications and/or patents are herein incorporated by
reference in their entirety for all purposes.

This application is a continuation-in-part of, and claims
priority to, U.S. patent application Ser. No. 16/280,259
(AMDCP597), entitled "SYSTEM, METHOD, AND COM-
PUTER PROGRAM FOR DAMPING A FEEDBACK
LOAD-CHANGE IN A COMMUNICATION NETWORK
MANAGED BY AN AUTOMATIC NETWORK MAN-
AGEMENT SYSTEM," filed Feb. 20, 2019, which in turn
claims priority to U.S. Provisional Patent Application No.
62/639,913 (AMDCP597+), entitled "SYSTEM,
METHOD, AND COMPUTER PROGRAM FOR DAMP-
ING A FEEDBACK LOAD-CHANGE IN A COMMUNI-
CATION NETWORK MANAGED BY AN AUTOMATIC
NETWORK MANAGEMENT SYSTEM," filed Mar. 7,
2018. The foregoing applications and/or patents are herein
incorporated by reference in their entirety for all purposes.

This application is a continuation-in-part of, and claims
priority to, U.S. patent application Ser. No. 16/280,265
(AMDCP598), entitled "SYSTEM, METHOD, AND COM-
PUTER PROGRAM FOR IMPLEMENTING A MARKET-
PLACE FOR ARTIFICIAL INTELLIGENCE (AI) BASED
MANAGED NETWORK SERVICES," filed Feb. 20, 2019,
which in turn claims priority to U.S. Provisional Patent
Application No. 62/639,923 (AMDCP598+), entitled "SYS-
TEM, METHOD, AND COMPUTER PROGRAM FOR
IMPLEMENTING A MARKETPLACE FOR ARTIFICIAL
INTELLIGENCE (AI) BASED MANAGED NETWORK
SERVICES," filed Mar. 7, 2018. The foregoing applications
and/or patents are herein incorporated by reference in their
entirety for all purposes.

This application is a continuation-in-part of, and claims
priority to, U.S. patent application Ser. No. 16/280,272
(AMDCP599), entitled "SYSTEM, METHOD, AND COM-
PUTER PROGRAM FOR MITIGATING AN ATTACK ON
A NETWORK BY EFFECTING FALSE ALARMS," filed
Feb. 20, 2019, which in turn claims priority to U.S. Provi-
sional Patent Application No. 62/642,524 (AMDCP599+),
entitled "A METHOD AND A SYSTEM FOR MITIGAT-
ING AN ATTACK ON A NETWORK BY EFFECTING
FALSE ALARMS," filed Mar. 13, 2018. The foregoing
applications and/or patents are herein incorporated by ref-
erence in their entirety for all purposes.

This application is a continuation-in-part of, and claims
priority to, U.S. patent application Ser. No. 16/280,279
(AMDCP608), entitled "SYSTEM, METHOD, AND COM-
PUTER PROGRAM FOR AUTOMATICALLY GENERAT-
ING TRAINING DATA FOR ANALYZING A NEW CON-
FIGURATION OF A COMMUNICATION NETWORK,"
filed Feb. 20, 2019, which in turn claims priority to U.S.
Provisional Patent Application No. 62/648,281
(AMDCP608+), entitled "SYSTEM, METHOD, AND
COMPUTER PROGRAM FOR AUTOMATICALLY GEN-
ERATING TRAINING DATA FOR ANALYZING A NEW
CONFIGURATION OF A COMMUNICATION NET-
WORK," filed Mar. 26, 2018. The foregoing applications
and/or patents are herein incorporated by reference in their
entirety for all purposes.

This application is a continuation-in-part of, and claims
priority to, U.S. patent application Ser. No. 16/280,286
(AMDCP610), entitled "SYSTEM, METHOD, AND COM-
PUTER PROGRAM FOR IMPLEMENTING A MARKET-
PLACE FOR EDGE COMPUTING," filed Feb. 20, 2019,
which in turn claims priority to U.S. Provisional Patent
Application No. 62/648,287 (AMDCP610+), entitled "SYS- TEM, METHOD, AND COMPUTER PROGRAM FOR IMPLEMENTING A MARKETPLACE FOR EDGE COMPUTING, filed Mar. 26, 2018. The foregoing applications and/or patents are herein incorporated by reference in their entirety for all purposes.

This application is a continuation-in-part of, and claims priority to, U.S. patent application Ser. No. 16/280,301 (AMDCP616), entitled "SYSTEM, METHOD, AND COMPUTER PROGRAM FOR MITIGATING FALSIFIED LOG DATA PROVIDED TO AN AI-LEARNING SYSTEM," filed Feb. 20, 2019, which in turn claims priority to U.S. Provisional Patent Application No. 62/660,142 (AMDCP616+), entitled "SYSTEM, METHOD, AND COMPUTER PROGRAM FOR MITIGATING FALSIFIED LOG-DATA PROVIDED TO AN AI-LEARNING SYSTEM MANAGING A COMMUNICATION NETWORK," filed Apr. 19, 2018. The foregoing applications and/or patents are herein incorporated by reference in their entirety for all purposes.

This application is a continuation-in-part of, and claims priority to, U.S. patent application Ser. No. 16/453,584 (AMDCP621), entitled "SYSTEM, METHOD, AND COMPUTER PROGRAM FOR VALIDATING ARTIFICIAL INTELLIGENCE MODELS," filed Jun. 26, 2019, which in turn claims priority to U.S. Provisional Patent Application No. 62/690,290 (AMDCP 621+), entitled "SYSTEM, METHOD, AND COMPUTER PROGRAM FOR VALIDATING ARTIFICIAL INTELLIGENCE MODELS," filed Jun. 26, 2018. The foregoing applications and/or patents are herein incorporated by reference in their entirety for all purposes.

This application is a continuation-in-part of, and claims priority to, U.S. patent application Ser. No. 16/280,310 (AMDCP636), entitled "SYSTEM, METHOD, AND COMPUTER PROGRAM FOR PREPARING MULTI-FEED OF LOG DATA IN AN AI-MANAGED COMMUNICATION SYSTEM," filed Feb. 20, 2019, which in turn claims priority to: U.S. Provisional Patent Application No. 62/639,910 (AMDCP596+), entitled "SYSTEM, METHOD, AND COMPUTER PROGRAM FOR IMPLEMENTING PRUNING RULES IN AN ARTIFICIAL INTELLIGENCE (AI) BASED NETWORK MANAGEMENT SYSTEM," filed Mar. 7, 2018; U.S. Provisional Application No. 62/639,913, entitled "SYSTEM, METHOD, AND COMPUTER PROGRAM FOR DAMPING A FEEDBACK LOAD-CHANGE IN A COMMUNICATION NETWORK MANAGED BY AN AUTOMATIC NETWORK MANAGEMENT SYSTEM," filed Mar. 7, 2018; U.S. Provisional Application No. 62/639,923 (AMDCP598+), entitled "SYSTEM, METHOD, AND COMPUTER PROGRAM FOR IMPLEMENTING A MARKETPLACE FOR ARTIFICIAL INTELLIGENCE (AI) BASED MANAGED NETWORK SERVICES," filed Mar. 7, 2018; U.S. Provisional Application No. 62/642,524 (AMDCP599+), entitled "A METHOD AND A SYSTEM FOR MITIGATING AN ATTACK ON A NETWORK BY EFFECTING FALSE ALARMS," filed Mar. 13, 2018; U.S. Provisional Application No. 62/648,281 (AMDCP608+), entitled "SYSTEM, METHOD, AND COMPUTER PROGRAM FOR AUTOMATICALLY GENERATING TRAINING DATA FOR ANALYZING A NEW CONFIGURATION OF A COMMUNICATION NETWORK," filed Mar. 26, 2018; U.S. Provisional Application No. 62/648,287 (AMDCP610+), entitled "SYSTEM, METHOD, AND COMPUTER PROGRAM FOR IMPLEMENTING A MARKETPLACE FOR EDGE COMPUTING," filed Mar. 26, 2018; and U.S. Provisional Application No. 62/660,142 (AMDCP616+), entitled "SYSTEM, METHOD, AND COMPUTER PROGRAM FOR MITIGATING FALSIFIED LOG DATA PROVIDED TO AN AI-LEARNING SYSTEM MANAGING A COMMUNICATION NETWORK," filed Apr. 19, 2018. The foregoing applications and/or patents are herein incorporated by reference in their entirety for all purposes.

This application is a continuation-in-part of, and claims priority to, U.S. patent application Ser. No. 16/280,312 (AMDCP637), entitled "SYSTEM, METHOD, AND COMPUTER PROGRAM FOR OPERATING A MULTI-STAGE ARTIFICIAL INTELLIGENCE (AI) ANALYSIS IN A COMMUNICATION NETWORK," filed Feb. 20, 2019, which in turn claims priority to: U.S. Provisional Patent Application No. 62/639,910 (AMDCP596+), entitled "SYSTEM, METHOD, AND COMPUTER PROGRAM FOR IMPLEMENTING PRUNING RULES IN AN ARTIFICIAL INTELLIGENCE (AI) BASED NETWORK MANAGEMENT SYSTEM," filed Mar. 7, 2018; U.S. Provisional Application No. 62/639,913, entitled "SYSTEM, METHOD, AND COMPUTER PROGRAM FOR DAMPING A FEEDBACK LOAD-CHANGE IN A COMMUNICATION NETWORK MANAGED BY AN AUTOMATIC NETWORK MANAGEMENT SYSTEM," filed Mar. 7, 2018; U.S. Provisional Application No. 62/639,923 (AMDCP598+), entitled "SYSTEM, METHOD, AND COMPUTER PROGRAM FOR IMPLEMENTING A MARKETPLACE FOR ARTIFICIAL INTELLIGENCE (AI) BASED MANAGED NETWORK SERVICES," filed Mar. 7, 2018; U.S. Provisional Application No. 62/642,524 (AMDCP599+), entitled "A METHOD AND A SYSTEM FOR MITIGATING AN ATTACK ON A NETWORK BY EFFECTING FALSE ALARMS," filed Mar. 13, 2018; U.S. Provisional Application No. 62/648,281 (AMDCP608+), entitled "SYSTEM, METHOD, AND COMPUTER PROGRAM FOR AUTOMATICALLY GENERATING TRAINING DATA FOR ANALYZING A NEW CONFIGURATION OF A COMMUNICATION NETWORK," filed Mar. 26, 2018; U.S. Provisional Application No. 62/648,287 (AMDCP610+), entitled "SYSTEM, METHOD, AND COMPUTER PROGRAM FOR IMPLEMENTING A MARKETPLACE FOR EDGE COMPUTING," filed Mar. 26, 2018; and U.S. Provisional Application No. 62/660,142 (AMDCP616+), entitled "SYSTEM, METHOD, AND COMPUTER PROGRAM FOR MITIGATING FALSIFIED LOG DATA PROVIDED TO AN AI-LEARNING SYSTEM MANAGING A COMMUNICATION NETWORK," filed Apr. 19, 2018. The foregoing applications and/or patents are herein incorporated by reference in their entirety for all purposes.

This application is a continuation-in-part of, and claims priority to, U.S. patent application Ser. No. 16/280,320 (AMDCP638), entitled "SYSTEM, METHOD, AND COMPUTER PROGRAM FOR PREPARING A MULTI-STAGE FRAMEWORK FOR ARTIFICIAL INTELLIGENCE (AI) ANALYSIS," filed Feb. 20, 2019, which in turn claims priority to: U.S. Provisional Patent Application No. 62/639, 910 (AMDCP596+), entitled "SYSTEM, METHOD, AND COMPUTER PROGRAM FOR IMPLEMENTING PRUNING RULES IN AN ARTIFICIAL INTELLIGENCE (AI) BASED NETWORK MANAGEMENT SYSTEM," filed Mar. 7, 2018; U.S. Provisional Application No. 62/639,913, entitled "SYSTEM, METHOD, AND COMPUTER PROGRAM FOR DAMPING A FEEDBACK LOAD-CHANGE IN A COMMUNICATION NETWORK MANAGED BY AN AUTOMATIC NETWORK MANAGEMENT SYSTEM," filed Mar. 7, 2018; U.S. Provisional Application No. 62/639,923 (AMDCP598+), entitled "SYSTEM,

US 12,627,576 B1

13

METHOD, AND COMPUTER PROGRAM FOR IMPLE-
MENTING A MARKETPLACE FOR ARTIFICIAL
INTELLIGENCE (AI) BASED MANAGED NETWORK
SERVICES," filed Mar. 7, 2018; U.S. Provisional Applica-
tion No. 62/642,524 (AMDCP599+), entitled "A METHOD
AND A SYSTEM FOR MITIGATING AN ATTACK ON A
NETWORK BY EFFECTING FALSE ALARMS," filed
Mar. 13, 2018; U.S. Provisional Application No. 62/648,281
(AMDCP608+), entitled "SYSTEM, METHOD, AND
COMPUTER PROGRAM FOR AUTOMATICALLY GEN-
ERATING TRAINING DATA FOR ANALYZING A NEW
CONFIGURATION OF A COMMUNICATION NET-
WORK," filed Mar. 26, 2018; U.S. Provisional Application
No. 62/648,287 (AMDCP610+), entitled "SYSTEM,
METHOD, AND COMPUTER PROGRAM FOR IMPLE-
MENTING A MARKETPLACE FOR EDGE COMPUT-
ING," filed Mar. 26, 2018; and U.S. Provisional Application
No. 62/660,142 (AMDCP616+), entitled "SYSTEM,
METHOD, AND COMPUTER PROGRAM FOR MITI-
GATING FALSIFIED LOG DATA PROVIDED TO AN
AI-LEARNING SYSTEM MANAGING A COMMUNI-
CATION NETWORK," filed Apr. 19, 2018. The foregoing
applications and/or patents are herein incorporated by ref-
erence in their entirety for all purposes.

This application is a continuation-in-part of, and claims
priority to, U.S. patent application Ser. No. 16/280,353
(AMDCP639), entitled "SYSTEM, METHOD, AND COM-
PUTER PROGRAM FOR EVALUATING CONFIDENCE
LEVEL OF PREDICTING A NETWORK SITUATION IN
A COMMUNICATION NETWORK MANAGED USING
ARTIFICIAL INTELLIGENCE," filed Feb. 20, 2019, which
in turn claims priority to: U.S. Provisional Patent Applica-
tion No. 62/639,910 (AMDCP596+), entitled "SYSTEM,
METHOD, AND COMPUTER PROGRAM FOR IMPLE-
MENTING PRUNING RULES IN AN ARTIFICIAL
INTELLIGENCE (AI) BASED NETWORK MANAGE-
MENT SYSTEM," filed Mar. 7, 2018; U.S. Provisional
Application No. 62/639,913, entitled "SYSTEM,
METHOD, AND COMPUTER PROGRAM FOR DAMP-
ING A FEEDBACK LOAD-CHANGE IN A COMMUNI-
CATION NETWORK MANAGED BY AN AUTOMATIC
NETWORK MANAGEMENT SYSTEM," filed Mar. 7,
2018; U.S. Provisional Application No. 62/639,923
(AMDCP598+), entitled "SYSTEM, METHOD, AND
COMPUTER PROGRAM FOR IMPLEMENTING A
MARKETPLACE FOR ARTIFICIAL INTELLIGENCE
(AI) BASED MANAGED NETWORK SERVICES," filed
Mar. 7, 2018; U.S. Provisional Application No. 62/642,524
(AMDCP599+), entitled "A METHOD AND A SYSTEM
FOR MITIGATING AN ATTACK ON A NETWORK BY
EFFECTING FALSE ALARMS," filed Mar. 13, 2018; U.S.
Provisional Application No. 62/648,281 (AMDCP608+),
entitled "SYSTEM, METHOD, AND COMPUTER PRO-
GRAM FOR AUTOMATICALLY GENERATING TRAIN-
ING DATA FOR ANALYZING A NEW CONFIGURA-
TION OF A COMMUNICATION NETWORK," filed Mar.
26, 2018; U.S. Provisional Application No. 62/648,287
(AMDCP610+), entitled "SYSTEM, METHOD, AND
COMPUTER PROGRAM FOR IMPLEMENTING A
MARKETPLACE FOR EDGE COMPUTING," filed Mar.
26, 2018; and U.S. Provisional Application No. 62/660,142
(AMDCP616+), entitled "SYSTEM, METHOD, AND
COMPUTER PROGRAM FOR MITIGATING FALSIFIED
LOG DATA PROVIDED TO AN AI-LEARNING SYSTEM
MANAGING A COMMUNICATION NETWORK," filed

14

Apr. 19, 2018. The foregoing applications and/or patents are
herein incorporated by reference in their entirety for all
purposes.

This application is a continuation-in-part of, and claims
priority to, U.S. patent application Ser. No. 16/280,367
(AMDCP640), entitled "SYSTEM, METHOD, AND COM-
PUTER PROGRAM FOR OPERATING MULTI-FEED OF
LOG-DATA IN AN AI-MANAGED COMMUNICATION
SYSTEM," filed Feb. 20, 2019, which in turn claims priority
to: U.S. Provisional Patent Application No. 62/639,910
(AMDCP596+), entitled "SYSTEM, METHOD, AND
COMPUTER PROGRAM FOR IMPLEMENTING PRUN-
ING RULES IN AN ARTIFICIAL INTELLIGENCE (AI)
BASED NETWORK MANAGEMENT SYSTEM," filed
Mar. 7, 2018; U.S. Provisional Application No. 62/639,913,
entitled "SYSTEM, METHOD, AND COMPUTER PRO-
GRAM FOR DAMPING A FEEDBACK LOAD-CHANGE
IN A COMMUNICATION NETWORK MANAGED BY
AN AUTOMATIC NETWORK MANAGEMENT SYS-
TEM," filed Mar. 7, 2018; U.S. Provisional Application No.
62/639,923 (AMDCP598+), entitled "SYSTEM,
METHOD, AND COMPUTER PROGRAM FOR IMPLE-
MENTING A MARKETPLACE FOR ARTIFICIAL
INTELLIGENCE (AI) BASED MANAGED NETWORK
SERVICES," filed Mar. 7, 2018; U.S. Provisional Applica-
tion No. 62/642,524 (AMDCP599+), entitled "A METHOD
AND A SYSTEM FOR MITIGATING AN ATTACK ON A
NETWORK BY EFFECTING FALSE ALARMS," filed
Mar. 13, 2018; U.S. Provisional Application No. 62/648,281
(AMDCP608+), entitled "SYSTEM, METHOD, AND
COMPUTER PROGRAM FOR AUTOMATICALLY GEN-
ERATING TRAINING DATA FOR ANALYZING A NEW
CONFIGURATION OF A COMMUNICATION NET-
WORK," filed Mar. 26, 2018; U.S. Provisional Application
No. 62/648,287 (AMDCP610+), entitled "SYSTEM,
METHOD, AND COMPUTER PROGRAM FOR IMPLE-
MENTING A MARKETPLACE FOR EDGE COMPUT-
ING," filed Mar. 26, 2018; and U.S. Provisional Application
No. 62/660,142 (AMDCP616+), entitled "SYSTEM,
METHOD, AND COMPUTER PROGRAM FOR MITI-
GATING FALSIFIED LOG DATA PROVIDED TO AN
AI-LEARNING SYSTEM MANAGING A COMMUNI-
CATION NETWORK," filed Apr. 19, 2018. The foregoing
applications and/or patents are herein incorporated by ref-
erence in their entirety for all purposes.

This application is a continuation-in-part of, and claims
priority to, U.S. patent application Ser. No. 16/280,246
(AMDCP641), entitled "SYSTEM, METHOD, AND COM-
PUTER PROGRAM FOR DETERMINING DYNAMIC
SUBNETWORKS IN A COMMUNICATION NET-
WORK," filed Feb. 20, 2019, which in turn claims priority
to: U.S. Provisional Patent Application No. 62/639,910
(AMDCP596+), entitled "SYSTEM, METHOD, AND
COMPUTER PROGRAM FOR IMPLEMENTING PRUN-
ING RULES IN AN ARTIFICIAL INTELLIGENCE (AI)
BASED NETWORK MANAGEMENT SYSTEM," filed
Mar. 7, 2018; U.S. Provisional Application No. 62/639,913,
entitled "SYSTEM, METHOD, AND COMPUTER PRO-
GRAM FOR DAMPING A FEEDBACK LOAD-CHANGE
IN A COMMUNICATION NETWORK MANAGED BY
AN AUTOMATIC NETWORK MANAGEMENT SYS-
TEM," filed Mar. 7, 2018; U.S. Provisional Application No.
62/639,923 (AMDCP598+), entitled "SYSTEM,
METHOD, AND COMPUTER PROGRAM FOR IMPLE-
MENTING A MARKETPLACE FOR ARTIFICIAL
INTELLIGENCE (AI) BASED MANAGED NETWORK
SERVICES," filed Mar. 7, 2018; U.S. Provisional Application No. 62/642,524 (AMDCP599+), entitled "A METHOD AND A SYSTEM FOR MITIGATING AN ATTACK ON A NETWORK BY EFFECTING FALSE ALARMS," filed Mar. 13, 2018; U.S. Provisional Application No. 62/648,281 (AMDCP608+), entitled "SYSTEM, METHOD, AND COMPUTER PROGRAM FOR AUTOMATICALLY GENERATING TRAINING DATA FOR ANALYZING A NEW CONFIGURATION OF A COMMUNICATION NETWORK," filed Mar. 26, 2018; U.S. Provisional Application No. 62/648,287 (AMDCP610+), entitled "SYSTEM, METHOD, AND COMPUTER PROGRAM FOR IMPLEMENTING A MARKETPLACE FOR EDGE COMPUTING," filed Mar. 26, 2018; and U.S. Provisional Application No. 62/660,142 (AMDCP616+), entitled "SYSTEM, METHOD, AND COMPUTER PROGRAM FOR MITIGATING FALSIFIED LOG DATA PROVIDED TO AN AI-LEARNING SYSTEM MANAGING A COMMUNICATION NETWORK," filed Apr. 19, 2018. The foregoing applications and/or patents are herein incorporated by reference in their entirety for all purposes.

This application is a continuation-in-part of, and claims priority to, U.S. patent application Ser. No. 16/280,260 (AMDCP642), entitled "SYSTEM, METHOD, AND COMPUTER PROGRAM FOR AUTOMATIC LABELING OF TRAINING AND TESTING DATA IN A COMMUNICATION SYSTEM," filed Feb. 20, 2019, which in turn claims priority to: U.S. Provisional Patent Application No. 62/639,910 (AMDCP596+), entitled "SYSTEM, METHOD, AND COMPUTER PROGRAM FOR IMPLEMENTING PRUNING RULES IN AN ARTIFICIAL INTELLIGENCE (AI) BASED NETWORK MANAGEMENT SYSTEM," filed Mar. 7, 2018; U.S. Provisional Application No. 62/639,913, entitled "SYSTEM, METHOD, AND COMPUTER PROGRAM FOR DAMPING A FEEDBACK LOAD-CHANGE IN A COMMUNICATION NETWORK MANAGED BY AN AUTOMATIC NETWORK MANAGEMENT SYSTEM," filed Mar. 7, 2018; U.S. Provisional Application No. 62/639,923 (AMDCP598+), entitled "SYSTEM, METHOD, AND COMPUTER PROGRAM FOR IMPLEMENTING A MARKETPLACE FOR ARTIFICIAL INTELLIGENCE (AI) BASED MANAGED NETWORK SERVICES," filed Mar. 7, 2018; U.S. Provisional Application No. 62/642,524 (AMDCP599+), entitled "A METHOD AND A SYSTEM FOR MITIGATING AN ATTACK ON A NETWORK BY EFFECTING FALSE ALARMS," filed Mar. 13, 2018; U.S. Provisional Application No. 62/648,281 (AMDCP608+), entitled "SYSTEM, METHOD, AND COMPUTER PROGRAM FOR AUTOMATICALLY GENERATING TRAINING DATA FOR ANALYZING A NEW CONFIGURATION OF A COMMUNICATION NETWORK," filed Mar. 26, 2018; U.S. Provisional Application No. 62/648,287 (AMDCP610+), entitled "SYSTEM, METHOD, AND COMPUTER PROGRAM FOR IMPLEMENTING A MARKETPLACE FOR EDGE COMPUTING," filed Mar. 26, 2018; and U.S. Provisional Application No. 62/660,142 (AMDCP616+), entitled "SYSTEM, METHOD, AND COMPUTER PROGRAM FOR MITIGATING FALSIFIED LOG DATA PROVIDED TO AN AI-LEARNING SYSTEM MANAGING A COMMUNICATION NETWORK," filed Apr. 19, 2018. The foregoing applications and/or patents are herein incorporated by reference in their entirety for all purposes.

This application is a continuation-in-part of, and claims priority to, U.S. patent application Ser. No. 16/280,386 (AMDCP643), entitled "SYSTEM, METHOD, AND COMPUTER PROGRAM FOR AUTOMATIC RECONFIGURATION OF A COMMUNICATION NETWORK," filed Feb. 20, 2019, which in turn claims priority to: U.S. Provisional Patent Application No. 62/639,910 (AMDCP596+), entitled "SYSTEM, METHOD, AND COMPUTER PROGRAM FOR IMPLEMENTING PRUNING RULES IN AN ARTIFICIAL INTELLIGENCE (AI) BASED NETWORK MANAGEMENT SYSTEM," filed Mar. 7, 2018; U.S. Provisional Application No. 62/639,913, entitled "SYSTEM, METHOD, AND COMPUTER PROGRAM FOR DAMPING A FEEDBACK LOAD-CHANGE IN A COMMUNICATION NETWORK MANAGED BY AN AUTOMATIC NETWORK MANAGEMENT SYSTEM," filed Mar. 7, 2018; U.S. Provisional Application No. 62/639,923 (AMDCP598+), entitled "SYSTEM, METHOD, AND COMPUTER PROGRAM FOR IMPLEMENTING A MARKETPLACE FOR ARTIFICIAL INTELLIGENCE (AI) BASED MANAGED NETWORK SERVICES," filed Mar. 7, 2018; U.S. Provisional Application No. 62/642,524 (AMDCP599+), entitled "A METHOD AND A SYSTEM FOR MITIGATING AN ATTACK ON A NETWORK BY EFFECTING FALSE ALARMS," filed Mar. 13, 2018; U.S. Provisional Application No. 62/648,281 (AMDCP608+), entitled "SYSTEM, METHOD, AND COMPUTER PROGRAM FOR AUTOMATICALLY GENERATING TRAINING DATA FOR ANALYZING A NEW CONFIGURATION OF A COMMUNICATION NETWORK," filed Mar. 26, 2018; U.S. Provisional Application No. 62/648,287 (AMDCP610+), entitled "SYSTEM, METHOD, AND COMPUTER PROGRAM FOR IMPLEMENTING A MARKETPLACE FOR EDGE COMPUTING," filed Mar. 26, 2018; and U.S. Provisional Application No. 62/660,142 (AMDCP616+), entitled "SYSTEM, METHOD, AND COMPUTER PROGRAM FOR MITIGATING FALSIFIED LOG DATA PROVIDED TO AN AI-LEARNING SYSTEM MANAGING A COMMUNICATION NETWORK," filed Apr. 19, 2018. The foregoing applications and/or patents are herein incorporated by reference in their entirety for all purposes.

This application is a continuation-in-part of, and claims priority to, U.S. patent application Ser. No. 16/290,773 (AMDCP644), entitled "SYSTEM, METHOD, AND COMPUTER PROGRAM FOR MAXIMIZING A RECEPTIVITY SCORE OF USER(S) TO A MEDIA," filed Mar. 1, 2019, which is incorporated herein by reference in its entirety.

This application is a continuation-in-part of, and claims priority to, U.S. patent application Ser. No. 16/280,513 (AMDCP645), entitled "SYSTEM, METHOD, AND COMPUTER PROGRAM FOR A DETERMINING A NETWORK SITUATION IN A COMMUNICATION NETWORK," filed Feb. 20, 2019, which in turn claims priority to: U.S. Provisional Patent Application No. 62/639,910 (AMDCP596+), entitled "SYSTEM, METHOD, AND COMPUTER PROGRAM FOR IMPLEMENTING PRUNING RULES IN AN ARTIFICIAL INTELLIGENCE (AI) BASED NETWORK MANAGEMENT SYSTEM," filed Mar. 7, 2018; U.S. Provisional Application No. 62/639,913, entitled "SYSTEM, METHOD, AND COMPUTER PROGRAM FOR DAMPING A FEEDBACK LOAD-CHANGE IN A COMMUNICATION NETWORK MANAGED BY AN AUTOMATIC NETWORK MANAGEMENT SYSTEM," filed Mar. 7, 2018; U.S. Provisional Application No. 62/639,923 (AMDCP598+), entitled "SYSTEM, METHOD, AND COMPUTER PROGRAM FOR IMPLEMENTING A MARKETPLACE FOR ARTIFICIAL INTELLIGENCE (AI) BASED MANAGED NETWORK SERVICES," filed Mar. 7, 2018; U.S. Provisional Application No. 62/642,524 (AMDCP599+), entitled "A METHOD AND A SYSTEM FOR MITIGATING AN ATTACK ON A NETWORK BY EFFECTING FALSE ALARMS," filed Mar. 13, 2018; U.S. Provisional Application No. 62/648,281 (AMDCP608+), entitled "SYSTEM, METHOD, AND COMPUTER PROGRAM FOR AUTOMATICALLY GENERATING TRAINING DATA FOR ANALYZING A NEW CONFIGURATION OF A COMMUNICATION NETWORK," filed Mar. 26, 2018; U.S. Provisional Application No. 62/648,287 (AMDCP610+), entitled "SYSTEM, METHOD, AND COMPUTER PROGRAM FOR IMPLEMENTING A MARKETPLACE FOR EDGE COMPUTING," filed Mar. 26, 2018; and U.S. Provisional Application No. 62/660,142 (AMDCP616+), entitled "SYSTEM, METHOD, AND COMPUTER PROGRAM FOR MITIGATING FALSIFIED LOG DATA PROVIDED TO AN AI-LEARNING SYSTEM MANAGING A COMMUNICATION NETWORK," filed Apr. 19, 2018. The foregoing applications and/or patents are herein incorporated by reference in their entirety for all purposes.

This application is a continuation-in-part of, and claims priority to, U.S. patent application Ser. No. 16/280,634 (AMDCP646), entitled "SYSTEM, METHOD, AND COMPUTER PROGRAM FOR IMPROVING A QUALITY OF EXPERIENCE BASED ON ARTIFICIAL INTELLIGENCE," filed Feb. 20, 2019, which in turn claims priority to: U.S. Provisional Patent Application No. 62/639,910 (AMDCP596+), entitled "SYSTEM, METHOD, AND COMPUTER PROGRAM FOR IMPLEMENTING PRUNING RULES IN AN ARTIFICIAL INTELLIGENCE (AI) BASED NETWORK MANAGEMENT SYSTEM," filed Mar. 7, 2018; U.S. Provisional Application No. 62/639,913, entitled "SYSTEM, METHOD, AND COMPUTER PROGRAM FOR DAMPING A FEEDBACK LOAD-CHANGE IN A COMMUNICATION NETWORK MANAGED BY AN AUTOMATIC NETWORK MANAGEMENT SYSTEM," filed Mar. 7, 2018; U.S. Provisional Application No. 62/639,923 (AMDCP598+), entitled "SYSTEM, METHOD, AND COMPUTER PROGRAM FOR IMPLEMENTING A MARKETPLACE FOR ARTIFICIAL INTELLIGENCE (AI) BASED MANAGED NETWORK SERVICES," filed Mar. 7, 2018; U.S. Provisional Application No. 62/642,524 (AMDCP599+), entitled "A METHOD AND A SYSTEM FOR MITIGATING AN ATTACK ON A NETWORK BY EFFECTING FALSE ALARMS," filed Mar. 13, 2018; U.S. Provisional Application No. 62/648,281 (AMDCP608+), entitled "SYSTEM, METHOD, AND COMPUTER PROGRAM FOR AUTOMATICALLY GENERATING TRAINING DATA FOR ANALYZING A NEW CONFIGURATION OF A COMMUNICATION NETWORK," filed Mar. 26, 2018; U.S. Provisional Application No. 62/648,287 (AMDCP610+), entitled "SYSTEM, METHOD, AND COMPUTER PROGRAM FOR IMPLEMENTING A MARKETPLACE FOR EDGE COMPUTING," filed Mar. 26, 2018; and U.S. Provisional Application No. 62/660,142 (AMDCP616+), entitled "SYSTEM, METHOD, AND COMPUTER PROGRAM FOR MITIGATING FALSIFIED LOG DATA PROVIDED TO AN AI-LEARNING SYSTEM MANAGING A COMMUNICATION NETWORK," filed Apr. 19, 2018. The foregoing applications and/or patents are herein incorporated by reference in their entirety for all purposes.

This application is a continuation-in-part of, and claims priority to, U.S. patent application Ser. No. 16/255,609 (AMDCP647), entitled "SYSTEM, METHOD, AND COMPUTER PROGRAM FOR PARENTAL CONTROLS AND RECOMMENDATIONS BASED ON ARTIFICIAL INTELLIGENCE," filed Jan. 23, 2019, which is incorporated herein by reference in its entirety.

This application is a continuation-in-part of, and claims priority to, U.S. patent application Ser. No. 16/255,635 (AMDCP648), entitled "SYSTEM, METHOD, AND COMPUTER PROGRAM FOR MODIFYING MEDIA FILES BASED ON ARTIFICIAL INTELLIGENCE," filed Jan. 23, 2019, which is incorporated herein by reference in its entirety.

This application is a continuation-in-part of, and claims priority to, U.S. patent application Ser. No. 16/290,779 (AMDCP649), entitled "SYSTEM, METHOD, AND COMPUTER PROGRAM FOR DETERMINING A RECEPTIVITY SCORE BASED ON ARTIFICIAL INTELLIGENCE (AI)," filed Mar. 1, 2019, which is incorporated herein by reference in its entirety.

This application is a continuation-in-part of, and claims priority to, U.S. patent application Ser. No. 16/782,906 (AMDCP667), entitled "SYSTEM, METHOD, AND COMPUTER PROGRAM FOR PROCESSING A CUSTOMER PROPOSITION WINDOW," filed Feb. 5, 2020, which is incorporated herein by reference in its entirety.

This application is a continuation-in-part of, and claims priority to, U.S. patent application Ser. No. 16/782,934 (AMDCP676), entitled "SYSTEM, METHOD, AND COMPUTER PROGRAM FOR GROUPING CUSTOMERS AND VALUATING GROUPS," filed Feb. 5, 2020, which is incorporated herein by reference in its entirety.

This application is a continuation-in-part of, and claims priority to, U.S. patent application Ser. No. 16/782,956 (AMDCP677), entitled "SYSTEM, METHOD, AND COMPUTER PROGRAM FOR COSTING A CUSTOMER OF A COMMUNICATION NETWORK," filed Feb. 5, 2020, which is incorporated herein by reference in its entirety.

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

This flexibility and dynamics of the VNF-based network complicates the means by which network availability is preserved. There is thus a need for addressing these and/or other issues associated with the prior art.

SUMMARY

According to one aspect of the present invention there is provided a system, method, and computer program product for recovering from a network failure in a communication network using network function virtualization (NFV-based network), the method including: selecting a first network component of the NFV-based network, detecting at least one probable failure of the first network component, selecting a second network component to be used for replacing the instance of the VNF in the first network component prior to a failure of the first network component, and securing at least one resource of the selected second network component for the other instance of the VNF and maintaining, in the selected second network component, an updated copy of data associated with the instance of the VNF in the first network component.

BRIEF DESCRIPTION OF THE DRAWINGS

FIG. 4 illustrates a simplified diagram of an NFV management system, in accordance with one embodiment.

FIG. 10 illustrates a network architecture, in accordance with one possible embodiment.

DETAILED DESCRIPTION

Figure 1:
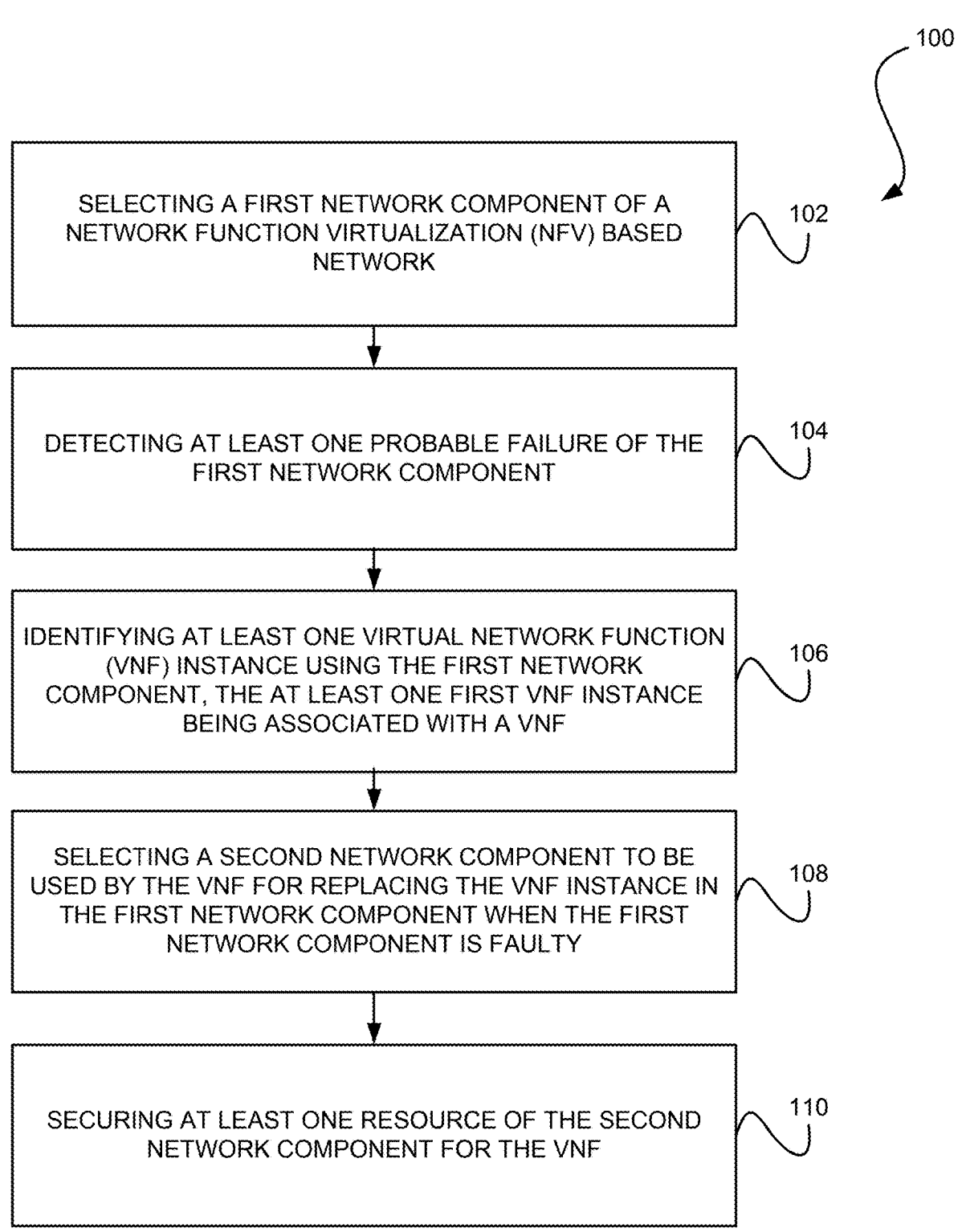
FIG. 1 illustrates a method for recovering from a network failure in a communication network using network function virtualization (NFV-based network), in accordance with one embodiment.

FIG. 1 illustrates a method 100 for recovering from a network failure in a communication network using network function virtualization (NFV-based network), in accordance with one embodiment.

As shown in FIG. 1, a first network component of a network function virtualization (NFV) based network is selected. See operation 102. Further, at least one probable failure of the first network component is detected. See operation 104.

Additionally, at least one virtual network function (VNF) instance using the first network component is identified. See operation 106. The at least one first VNF instance is associated with a VNF.

Furthermore, a second network component is selected to be used by the VNF for replacing the VNF instance in the first network component when the first network component is faulty. See operation 108. Moreover, at least one resource of the second network component is secured for the VNF. See operation 110.

In one embodiment, the method 100 may include verifying that the VNF is installed in the second network component for forming a backup for the VNF instance using the first network component.

In another embodiment, the method 100 may further include initiating a mirroring process maintaining in the second network component an updated copy of data associated with the VNF instance of the first network component. In this case, the updated copy of data may enable initiating a copy of the VNF instance in the second network component with minimal delay.

Further, in one embodiment, the method 100 may further include creating a plan for replacing, upon failure of the first network component, the VNF instance operating in the first network component with a VNF instance operating in the second network component. In another embodiment, the method 100 may include replacing, upon failure of the first network component, the VNF instance operating in the first network component with a VNF instance operating in the second network component.

Still yet, in one embodiment, the NFV-based network may include a third network component. In this case, at least one probable failure of the third network component may be detected. Additionally, at least one VNF instance using the third network component may be identified. Further, at least one resource of the second network component may be secured for the VNF. In this case, the at least one resource secured for the VNF of the first network component of the NFV-based network may be secured for the VNF of the third network component of the NFV-based network.

In another embodiment, at least one probable failure of the third network component may be detected. In addition, at least one VNF instance using the third network component may be identified. Further, a fourth network component may be selected to be used by same VNF for replacing the VNF instance in the third network component when the first network component is faulty and at least one resource of the fourth network component may be secured for the VNF. In this case, at least one resource of the second network component, and at least one resource of the fourth network component may be secured for both the VNFs of the first and third network components.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for planning, preparing and managing fault recovery in a network using network function virtualization (NFV) according to various embodiments may be further understood with reference to the following drawings and accompanying description.

Figure 2:
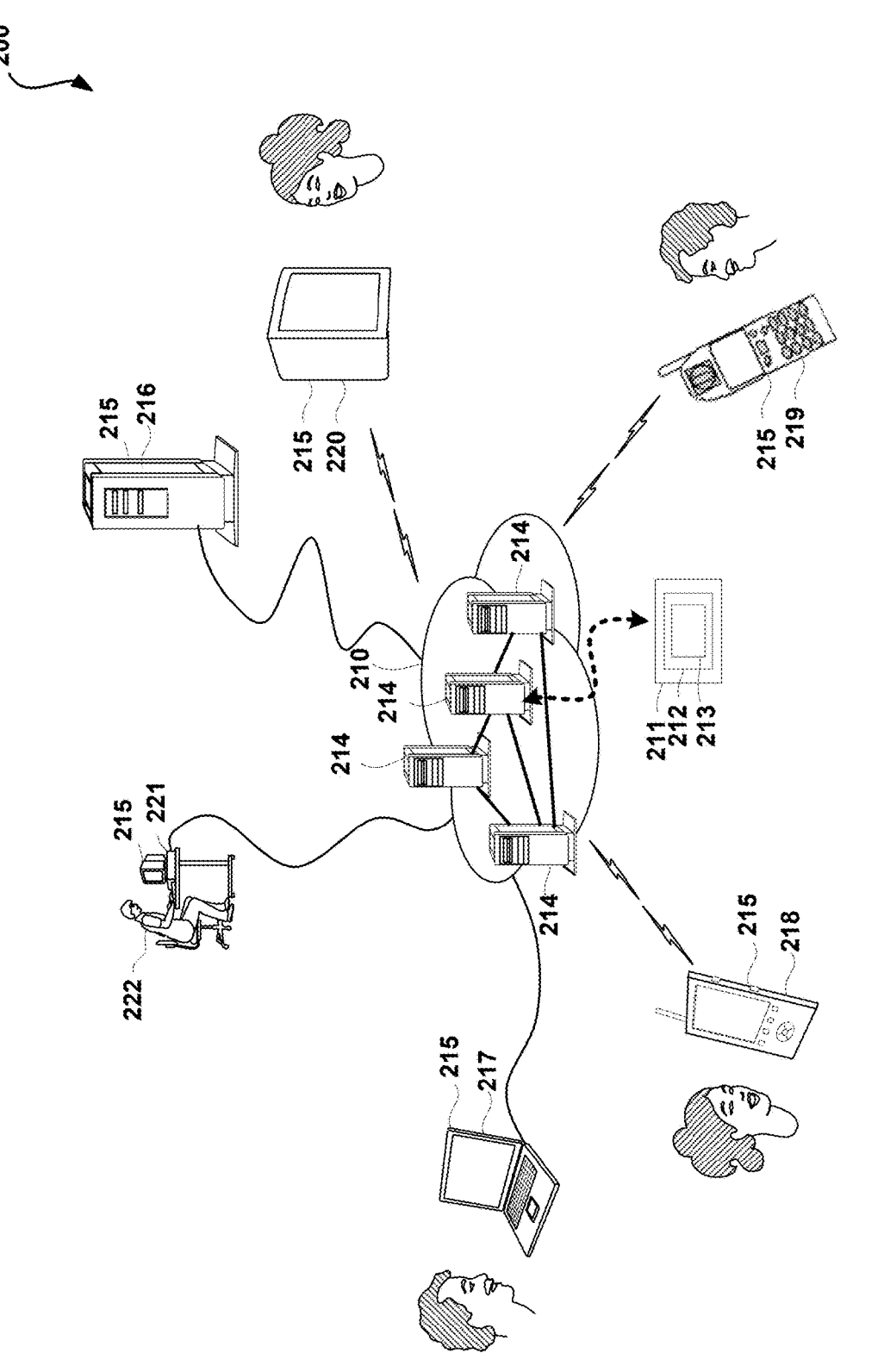
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, and a fault recovery module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the fault recovery module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The fault recovery module 213 may be a part or a component of the NFV-O module 212. However, the fault recovery module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the fault recovery module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.) 2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the fault recovery module 213.

Figure 3:
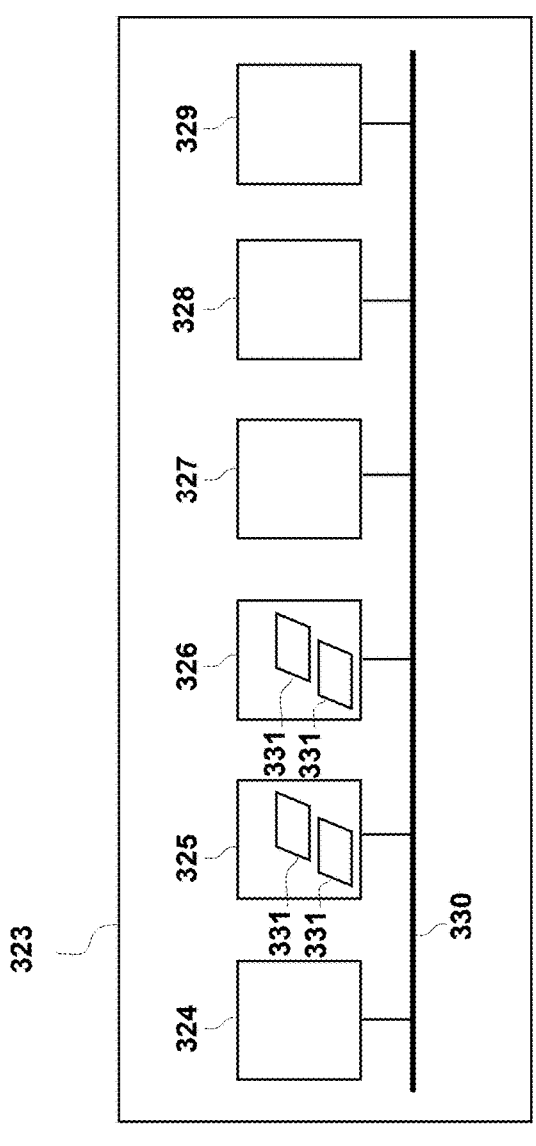
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the fault recovery module 213 of FIG. 2.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

More information regarding possible processes and/or embodiments for performing optimization of VNF deployment as may be performed by deployment optimization module 433 may be found in U.S. Provisional Patent Application No. 61/941,380, titled "System, Method, And Computer Program For Managing Hierarchy and Optimization In A Network Function Virtualization (NFV) Based Communication Network", and U.S. patent application Ser. No. 14/572,719, now U.S. Pat. No. 9,430,262, titled "System, Method, And Computer Program For Managing Hierarchy and Optimization In A Network Function Virtualization (NFV) Based Communication Network", which are incorporated by reference herein in their entirety.

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

More information regarding possible processes and/or embodiments for performing migration of a group of VNFs and/or VNF instances (chain migration), such as by deployment optimization module 433, may be found in U.S. Provisional Patent Application No. 62/026,512, titled "System, Method, And Computer Program For Optimizing a Chain of Virtual Network Functions In A Network Based On Function Virtualization", and U.S. patent application Ser. No. 14/572,728, titled "System, Method, And Computer Program For Optimizing a Chain of Virtual Network Functions In A Network Based On Function Virtualization (NFV)", which are incorporated by reference herein in their entirety.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfilment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

Service availability is a major and essential issue in any communication network. Network function virtualization (NFV) enables new and powerful tools for preserving service availability. In this context, service availability provides means for the network to survive faults (non-stop operation), or to quickly recover from faults. These means are based on redundancy built into the system. In a legacy network redundancy is allocated rigidly, usually within the hardware scope of a particular service. An NFV-based network enables much more flexible and dynamic allocation of redundancy thus increasing the efficiency and survivability of the network.

In a non-stop network all the components of the network are at least doubled and all the network components, and particularly processing, memory and storage, are duplicated at all times. Thus, no single point of failure may cause a network outage.

Quick recovery architecture is based on N+1 (or N+m) configuration. This architecture does not eliminate service discontinuity in case of failure, but shortens the period of service (or network) outage. N+m architecture requires restarting the failed sessions (being relatively instantaneous) and recovery of the failed memory and storage (being relatively lengthy). Mirroring processes enable shortening the down period of a service heavily based on memory or storage. Quick recovery architecture may also utilize inherent redundancy, for example where two (or more) communicating units are connected in two (or more) parallel connections.

In an NFV-based network any hardware unit may provide redundancy, whether in a non-stop manner or a quick recovery (N+m) manner. Similarly, VNF (and a respective VNF instance) providing redundancy (whether in a non-stop or a quick recovery manner) may be installed and executed on any (or a plurality of) hardware unit.

Subsequently, a service using a group of VNFs (and a respective VNF instances) may have redundancy provided by a matching group of VNFs (and a respective VNF instances) installed over a plurality of hardware units.

The fault recovery module 443 plans the recovery procedures from particular faults, and accordingly plans the provisioning and deployment of redundancy of hardware units, VNFs, and VNF instance so that hardware units supporting redundancy have sufficient resources (processing power, memory, storage, etc.) to execute the backup VNF instances when fault recovery is required.

To utilize efficiently the hierarchical structure and flexibility provided by the NFV architecture, the fault recovery module 443 uses the following mechanisms: continuous monitoring of the network activity; continuous predictive analysis, providing continuous analysis of customer behavior and predicting customers' needs and network requirements; continuous calculation of optimization of the network's NFV configuration (i.e. the optimal deployment of VNF instances); resource conversion consideration; and continuous migration of VNF instances along the network hierarchy to achieve the current, or near future, optimal deployment, while preserving service/session continuity. Continuous means run-time, real-time, online, on-the-fly, etc.

More information regarding possible processes for migrating VNF instances and preserving session continuity, as well as managing predictive or preventive maintenance, as may be embodied in fault recovery module 443 or an associated process, may be found in U.S. Provisional Patent Application No. 61/918,597, titled "System, Method, And Computer Program For Preserving Service Continuity In A Network Function Virtualization (NFV) Based Communication Network", and U.S. patent application Ser. No. 14/572,716, titled "System, Method, And Computer Program For Preserving Service Continuity In A Network Function Virtualization (NFV) Based Communication Network", which are incorporated by reference herein in their entirety.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

More information regarding possible processes for managing security, as may be embodied security management module 444, may be found in U.S. Provisional Patent Application No. 61/981,116, titled "System, Method, And Computer Program For Managing Security In A Network Based On Network Function Virtualization (NFV)", and U.S. patent application Ser. No. 14/572,723, now U.S. Pat. No. 9,460,286, titled "SYSTEM, METHOD, AND COMPUTER PROGRAM FOR MANAGING SECURITY IN A NETWORK FUNCTION VIRTUALIZATION (NFV) BASED COMMUNICATION NETWORK", which are incorporated by reference herein in their entirety.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfilment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities-receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
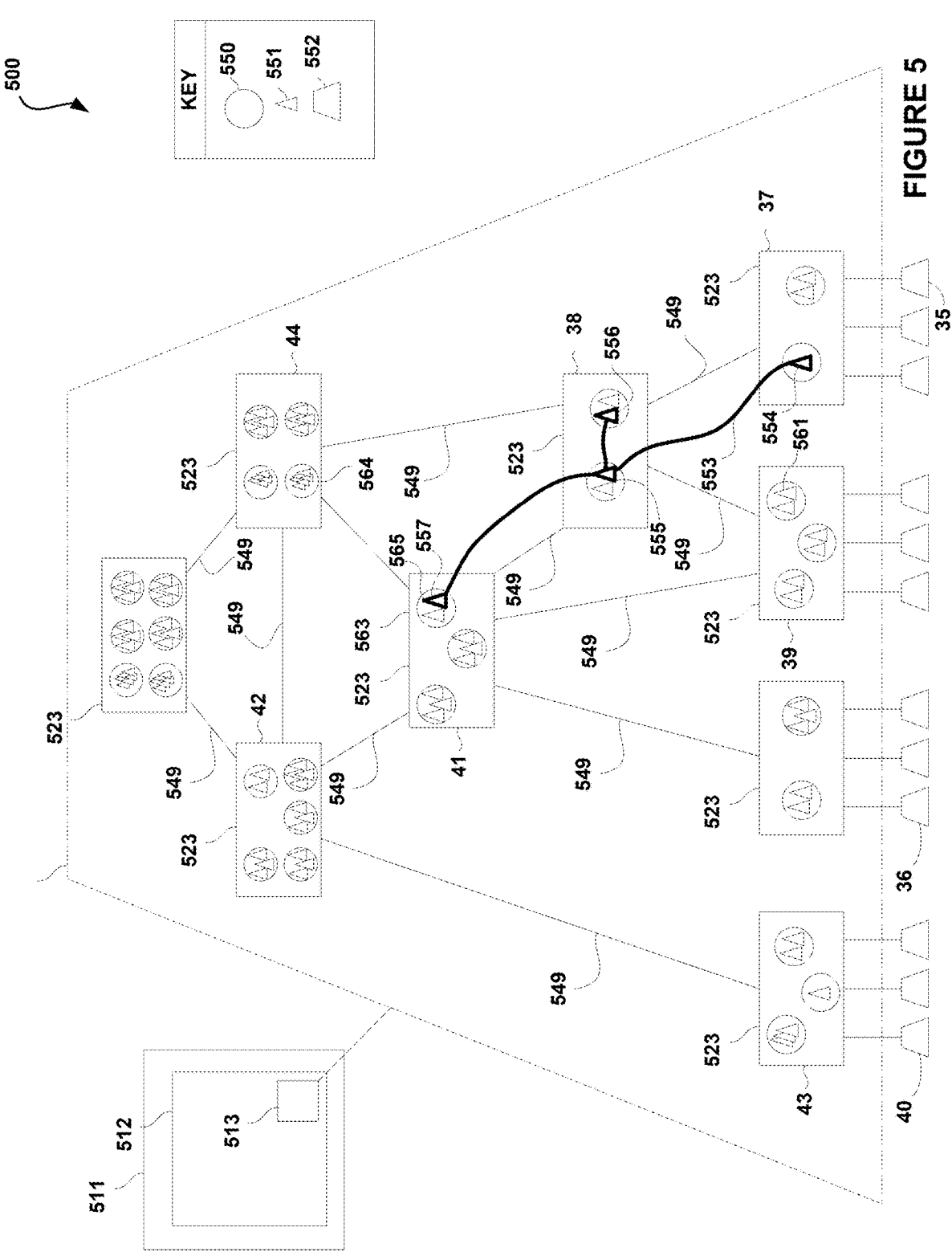
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and a fault recovery module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QOS) or service level agreement (SLA). Such requirements may include maximum latency or delay, average latency and maximum variance (latency jitter), maximal allowed packet loss, etc. Other requirements may include service availability, redundancy, backup, provisions for roll-back and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

The fault recovery module 513 plans the recovery procedures from particular faults, and accordingly plans the provisioning and deployment of redundancy of hardware units 523, VNFs 550, and VNF instance 551 so that hardware units 523 supporting redundancy have sufficient resources (processing power, memory, storage, etc.) to execute the backup VNF instances 551 when fault recovery is required.

In a first example shown in FIG. 5, terminals 552 designated by numerals 35 and 36 may communicate via hardware units 523 designated by numerals 37, 38 and 39, their associate transmission lines 549, and their respective VNF(s) 550, and VNF instance(s) 551.

In a second example shown in FIG. 5, terminals 552, designated by numerals 36 and 40, may communicate via hardware units 523 designated by numerals 39, 41, 42, and 43, their associate transmission lines 549, and their respective VNF(s) 550, and VNF instance(s) 551.

In a third example shown in FIG. 5, terminals 552 designated by numerals 36 and 40 may communicate via hardware units 523 designated by numerals 39, 38, 44, 42, and 43, and their associate transmission lines 549, VNF(s) 550, and VNF instance(s) 551. The communication path of this example provides an alternative communication path for the communication path of the second example, replacing hardware unit 41, with hardware units 38 and 44. Therefore, communication paths of the second and third examples have (inherent) redundancy with respect to hardware units 41, and 38, 44) and the transmission lines to and from these units.

The examples above involve one or more VNFs 550, and VNF instances 551 providing a service or an application connected with the communication between terminals 35 and 36 or 36 and 40. These VNFs 550, and their respective VNF instances 551 may be located, and/or installed, and/or operated in any of the hardware units 523 connecting the relevant terminals 552.

For example, for terminals 35 and 36 of the first example, the VNFs 550 and their VNF instances 551 can be located in any of hardware units 37, 38 and 39. For example, for terminals 36 and 40 of the second and third examples, VNFs 550 and their VNF instances 23 can be located in any of hardware units 523 such as hardware units 39, 41, 42 and 43 (for the second example) or hardware units 39, 38, 44, 42 and 43 (for the third example).

It is appreciated that, according to the second and third examples discussed above, hardware unit 41 may provide redundancy for hardware unit 38 (and the transmission line to and from hardware unit 38) and may replace it when hardware unit 38 becomes faulty. Similarly, hardware unit 44 may provide redundancy for hardware unit 41 (and the transmission line to and from hardware unit 41) and may replace it when hardware unit 41 becomes faulty.

It is also appreciated that the system described above with reference to FIG. 5, including fault recovery module 513 and using the NFV architecture, enables redundancy between different hardware units 523 such as hardware units 523 of different hardware construction (e.g., different processors or number of processors, different memory size, different storage size, etc.). This system also enables redundancy between hardware units 523 of different type such as different operating systems. Further, this system supports redundancy irrespective of the location of the hardware units 523. For example, where a first hardware unit providing redundancy for a second hardware unit is located in a different geographical region.

It is further appreciated that the system described above with reference to FIG. 5, including fault recovery module 513 and using the NFV architecture, enables redundancy irrespective of the application, such as a VNF 550, or a group of VNFs 550, or a service comprising a group of VNFs 550. Additionally, this system supports redundancy irrespective of the composition of VNFs 550 or VNF instances 551 in the two or more hardware units 523 providing redundancy. For example, a first and a second hardware units 523 may provide redundancy for a third hardware unit where each of the first and a second hardware units 523 provide redundancy for a different group of VNFs 550 or VNF instances 551. Similarly, a first hardware unit may provide redundancy for two or more different group of VNFs 550 or VNF instances 551 in different hardware units 523.

It is appreciated that the system described above with reference to FIG. 5, including fault recovery module 513 and using the NFV architecture, enables mirroring between various combinations of hardware units 523, VNFs 550 and/or VNF instances 551 as discussed above with reference to redundancy. In this respect, any hardware units 523 in the network can provided redundancy and/or mirroring to any other hardware unit, VNF 550 and/or VNF instance 551.

Figure 6:
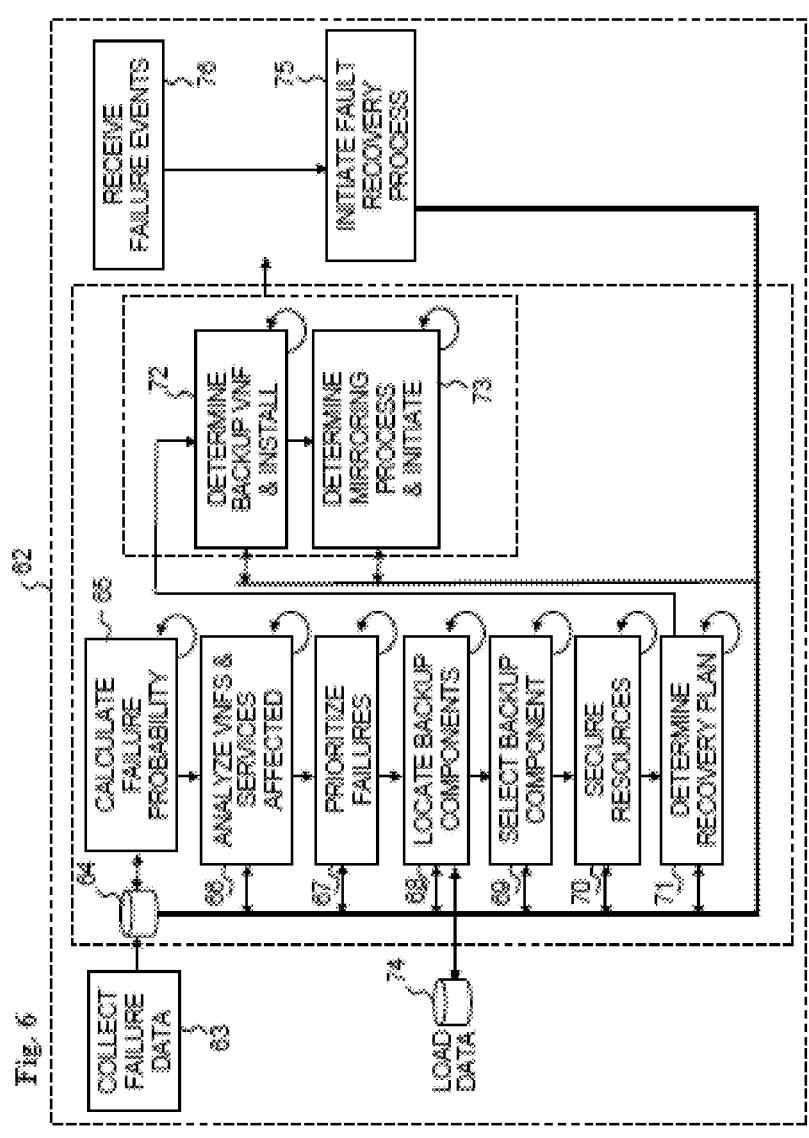
FIG. 6 is a simplified flow chart of a computing process executed by the fault recovery module, in accordance with one embodiment.

Reference is now made to FIG. 6, which is a simplified flow chart of a computing process 62 executing a fault recovery module, according to one embodiment.

According to the embodiment shown in FIG. 6, process 62 starts in step 63 by collecting failure data. Failure data refers to any type of information, for example, regarding: the type of hardware or software (e.g. hardware element or component, such as power supply, processor, memory, storage, cooling, etc., software component such as operating system, application software, VNF, etc.); any type of fault associated with each particular type of network component; a particular hardware or software components as deployed in the network; the relations of each particular network component (hardware or software) with other network components; mean time between failures (MTBF) and mean time to repair (MTTR); the relation of each type of fault to age and usage of the particular component; the ongoing load and use of each particular network components; customers' needs and operator's commitments such as QoS and SLA; and actual failures.

Some of the failure data is received from suppliers of hardware and software products. For example, MTBF and MTTR values, etc. Some of the failure data is collected by various modules of an NFV-O for the particular hardware and/or software components of the NFV-based network. For example, the ongoing load and use of each particular network components, customers' needs, and operator's commitments, etc. Some of the failure data is collected by various modules of the NFV-O for particular types of hardware and/or software components of the NFV-based network. For example, types of faults associated with each type of network component, types of faults associated with particular combinations of network components, the relation of each type of fault to age and usage, etc.

Step 63 feeds the data to memory or storage 64 that serves as the means of storage and communication between the various processes (steps) of the fault recovery module.

Process 62 proceeds to step 65 by calculating the probability of a particular failure of a network component, for each and every network component.

Process 62 then (step 66) analyses the VNF instances and services adversely affected by the failure.

Process 62 then (step 67) prioritize the failures by their probability, the affected services, according to the service agreements with the relevant customers, and considering the cost of altering the current fault recovery plan (if such exists).

Thereafter in step 68, for each failure, and according to priority, process 62 locates target network components that can replace the anticipated faulty network component at the particular anticipated time and according to the current and anticipated distribution of load (e.g. traffic load, processing load, memory load, storage load, etc.). That is to say that such target network component is expected to have, at the time of the failure, all the resources required to host the functionality currently hosted by the anticipated faulty component, typically taking in account service agreements (e.g. SLA) with the relevant customers.

For each failure, and according to priority, process 62 selects the preferred target (replacement) network components according to the VNF instances executed by the anticipated faulty component (step 69). It is appreciated that more than one target (replacement) network component can be selected for an anticipated faulty component. In that sense, VNF instances executed by the anticipated faulty component may be distributed in a plurality of replacement network components. It is appreciated that if backup resources are scarce, a VNF instance can be split into two or more VNF instances distributed in a respective number of target (replacement) network components.

In step 70, for each failure, and according their respective priorities, process 62 secures the required resources in the selected target (replacement, backup) network components. It is appreciated that by securing the resources, these resources are not allocated to other VNF instances or any other type of consumers of the relevant resources. This ensures the availability of the secured resources when the respective failure occurs.

In step 71, for each failure, and according their respective priorities, process 62 prepares a recovery plan for migrating the adversely affected VNF instances from the anticipated faulty component to the replacing components.

It is appreciated that the same resources may be allocated and/or secured for two or more recovery plans. This means, for example, that the same resources of a particular target (replacement, backup) network component may be allocated and/or secured for VNF instances associated with two or more anticipated faulty network component that are unlikely to fail within the same time period. Therefore, for example, high priority services or VNF instances may have exclusive target (replacement, backup) network component while two or more lower priority services or VNF instances may share a target (replacement, backup) network component.

It is appreciated that, for example, two (or more) pools of secured resources can be allocated in two (or more) target (replacement, backup) network components for three (or more) anticipated faulty network components.

Consequently in step 72, process 62 determines for each failure, and according to priority whether to install a VNF in the replacing components in advance of the predicted failure, to shorten the recovery process. If deemed needed, process 62 installs the VNF module.

In step 73 process 62 also determines for each failure, and according to priority, whether a mirroring process is required. If deemed needed, process 62 plans and initiates mirroring processes between the affected VNF instances and the backup VNFs (according to the service agreements with the relevant customers) to further shorten the recovery process. The term "affected VNF instance" refers to a VNF instance that is expected to be adversely affected by a particular probable future fault for which the current recovery plan is prepared.

It is appreciated that the process described above is repeated for various probable failures of a particular network component, and for various network components, typically according to the list of priorities. Therefore, process 62 generates a plurality of failure recovery plans, typically at least one plan for each failure of each network component.

It is appreciated that where a failure of a network element disables and/or deactivates the network element (so that another possible failure cannot occur for the same network element), the same target (replacement, backup) network components, and/or the same resources, may be used for two or more different possible failures of the same network element.

It is appreciated that target (replacement, backup) network components are selected based on their respective currently anticipated loads. It is appreciated that loads may evolve differently than anticipated, requiring changes of the fault recovery plans. Therefore, for example, when load data 74 changes, including data regarding anticipated loads, process 62 may have to recalculate some of the recovery plans, for example, by reprocessing at least some of steps 65 through 73.

When a fault occurs, process 62 executes step 75, initiating a recovery processes according to the received (step 76) failure event. An indication of a failure may be received from various sources, for example: an element management system (EMS), and/or a data center (DC) management system, and/or a cloud management system (CMS) 79 nay report a hardware failure; a control VNF instance, which is dedicated to measuring the availability and well-being of particular hardware components may indicate hardware problems; a control VNF instance, which is dedicated to measuring particular loads may indicate excessive loads or poor performance; VNF instances may have control points in which system performance is measured and reported; a customer may complain about poor network performance, or poor performance of a particular service, etc.; and an NFV-O may collect failure reports and performance reports, analyze the reports, and determine a failure.

Figure 7:
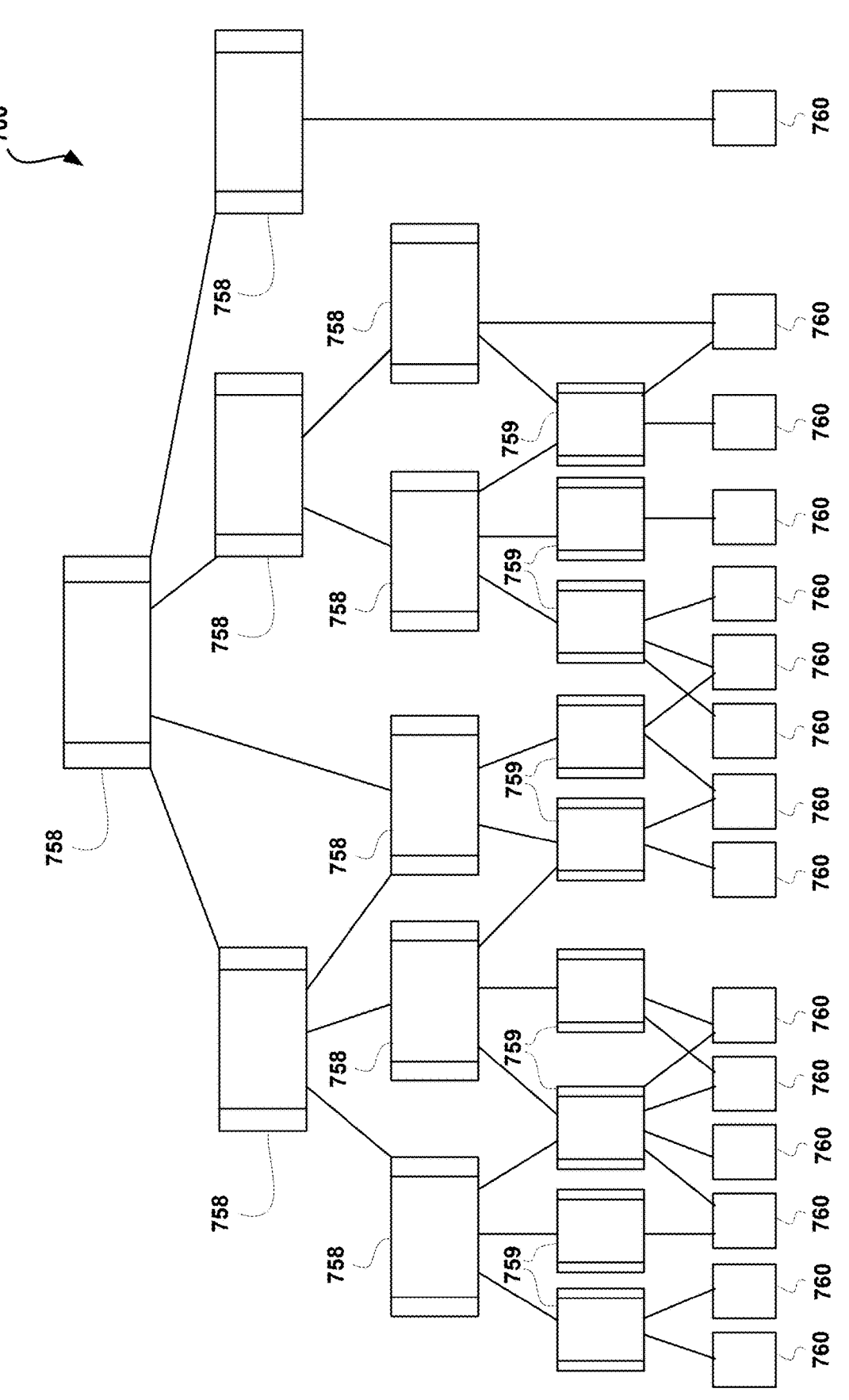
FIG. 7 illustrates a simplified diagram of a distributed deployment of an NFV-MANO (Management and Orchestration), in accordance with one embodiment.

FIG. 7 illustrates a simplified diagram 700 of a distributed deployment of an NFV-O, in accordance with one embodiment. As an option, the diagram 700 may be viewed in the context of the details of the previous Figures. For example, in one embodiment, the distributed deployment of the NFV-O may represent the NFV-based networks and associated elements described in the context of the previous Figures. Of course, however, the diagram 700 may be viewed in the context of any desired environment. Further, the aforementioned definitions may equally apply to the description below.

The distributed architecture of an NFV-O enables faster response to local events on one hand, and improved scalability on the other hand. In a distributed NFV-O architecture, decision processes are performed in self-contained and local decision points, closer to the customer, and closer to the events (e.g. such as network or security faults, etc.).

The hierarchy of a distributed NFV-O can be viewed as a tree of two component types: a core component 758 and a leaf component 759. The NFV-O core component 758 can be a child of another core component 758, and/or a parent of one or more core components 758 or leaf components 759. A leaf component 759 cannot be a parent of a core component 758 or a leaf component 759.

Orchestration parameters managed by a particular leaf component 759 or core component 758 may be reported in real-time to the supervising (parent) core component 758. In addition to the supervision, this continuous updating process enables the supervising component to provide backup, and/or support recovery processes associated with hardware and/or software faults as well as security faults and/or breeches.

To provide redundancy, a leaf component 759 may be supervised by two or more core components 758, and child core components 758 may be supervised by two or more parent core components 758. The orchestration parameters managed by a particular core component 758 or leaf component 759 may also be mirrored to the backup core components 758. Optionally, the NFV-O core components 758 may have the same fully functional orchestration capabilities, while leaf components may be limited to simple, well defined and localized sub-orchestration tasks, and thus may provide a faster response to demands and changing load.

A cloud management system (CMS) 760 is a software package managing one or more hardware units operating one or more VNFs and executing one or more VNF instances. A CMS 760 can be managed by one or more leaf components 759 or core components 758, or combinations thereof. A CMS 760 can be located in the operator's premises or in the customer's premises or partly in both.

An NFV-O component such as a core components 758 or a leaf component 759 typically orchestrates a particular, predefined, territory. The territory may be one or more cloud management systems 760, one or more services, one or more customers, etc. Therefore, there can be an overlap between territories of different NFV-O components. For example, one NFV-O component may orchestrate a CMS 760, another NFV-O component may orchestrate a service that is at least partly provided by the same CMS 760, and additionally a third NFV-O component may orchestrate services for a particular customer connected to that same CMS 760.

If, for any reason, the first responder NFV-O component cannot resolve the problem, for example, for lack of adequate or sufficient resources within the territory of the particular NFV-O component, the problem may be escalated above to the supervising or parent NFV-O component.

The NFV-O is a central component of the network as a system and thus may present a risk from a security perspective. For example, an attack against the NFV-O may result in a total network outage. Securing the NFV-O is therefore a goal and a challenge. A distributed NFV-O architecture enhances the network resilience/endurance. When an attack on a particular instance of the NFV-O is detected the NFV-O instance may be isolated and its functionality may be transferred to one or more other NFV-O instances.

Another aspect of the NFV-O hierarchy is stratified granularity, or resolution, of the orchestration process. An NFV-based network may include a very large number of hardware elements (e.g. processors, memory units, storage units, communication links, etc.) and an even larger number of VNFs and VNF-instances. Each of the VNF-instances may have a number of requirements (e.g. such as processing power, memory size, storage size, communication bandwidth, latency and jitter, etc.). Each of these hardware elements and software modules may produce a number of load values (e.g. corresponding to their respective requirements).

All of this creates a large amount of data that should be processed continuously or repeatedly to determine possible adverse conditions (e.g. a particular overload) or a potential cost saving situation. Such situation may require deployment optimization (e.g. the planning of a newly optimized deployment of VNF-instances) and redeployment (e.g. implementing the optimized deployment). The NFV-O hierarchy enables scalability of the redeployment optimization process by distributing the process in a hierarchical manner.

One optional aspect of hierarchical deployment optimization is that higher levels in the NFV-O hierarchy processes deployment optimization in a coarser granularity (or resolution), while lower levels in the NFV-O hierarchy processes deployment optimization in a finer granularity (or resolution).

For example, while a leaf component 759 manages its part (territory) of the NFV-based network in terms of particular hardware elements (e.g. processors, memory units, storage units, communication links, etc.) and software elements (e.g. VNFs and VNF-instances), a core component may manage its part (territory) of the NFV-based network in terms of whole subordinate (child) core components 758 or leaf components 759 it supervises. Thus, such parent core component 758 may perform deployment optimization in terms of requirements and load values applied to whole subordinate (child) core components 758 or leaf components 759.

A customer may use the services of several telecom operators. For example, the customer may be an international company operating in several countries. Such a customer usually establishes a virtual private network (VPN) across this plurality of telecom operators. Considering that these operators now operate NFV-based networks, the customer may establish a service including a plurality of VNFs, where different VNFs are part of different networks. Managing such inter-operator VNF-chains, or services, requires tight coordination across different NFV-based networks.

Such coordination can be implemented using various techniques. For example, the coordination may be implemented by enabling tight coordination between NFV-Os of the different NFV-based networks. As another example, the coordination may be implemented by establishing an inter-network NFV-O module that manages one or more inter-network VNF-chains, or services of a particular customer.

Optionally, such inter-network NFV-O may supervise two or more child or leaf NFV-O modules, each within a particular NFV-based network incorporating an NFV participating in the particular VNF-chain or service. It is appreciated that NFV-Os of different operators may be provided by different NFV-O vendors.

In a first network configuration a single NFV-O module may manage the deployment of VNFs and VNF instances throughout the entire NFV-based network. A deployment optimization module (e.g. and a chain optimization module) of the NFV-O module may continuously investigate the development of loads and provide alternative deployment plans. Consequently, the NFV-O module may redeploy VNFs and VNF instances and reallocate network resources accordingly.

Deployment optimization is indicated when one part of the NFV-based network is over-loaded (or approaches an overload situation) while another part of NFV-based network is relatively idle. The redeployment migrates some of the network entities (e.g. VNFs and VNF instances) from the overloaded part of NFV-based network to the relatively idle part of the NFV-based network to free resources where needed mostly. Therefore, the deployment optimization and redeployment activities may follow the changes of load distribution.

Figure 8:
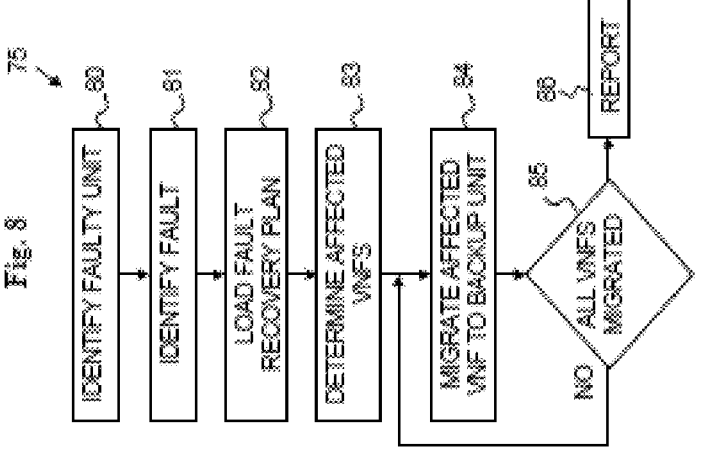
FIG. 8 is a simplified flow chart of a fault recovery process, in accordance with one embodiment.

Reference is now made to FIG. 8, which is a simplified flow chart of a fault recovery process as disclosed above with reference to step 75 of FIG. 6, and according to one embodiment.

The purpose of the fault recovery process 75 (step 75 of FIG. 6) is to migrate the VNF instances executed by the faulty hardware unit in their respective backup hardware units, as determined by the fault recovery planning process (steps 63 to 73 of computing process 62 executing the fault recovery module).

It is noted that the term faulty hardware unit may refer to any type of hardware fault and/or a software fault associated with the faulty hardware unit. Such hardware or software fault may completely terminate the capabilities of the faulty hardware unit of partly affect some of the capabilities. Therefore, it is possible that all the VNF instances are aborted instantaneously or that only few are affected but still function, or any combination thereof. Thus, one or more of the VNF instances should be migrated and restarted at their backup hardware units while other VNF instances should be migrated while preserving session continuity, at least partly. It is noted that the VNF instances to be migrated are determined according to the particular fault.

The fault recovery process of step 75 starts with step 80 to identify the faulty hardware unit and then step 81 to identify the particular fault. Then, in step 82, fault recovery process loads the fault recovery plan associated with the identified faulty hardware unit and fault.

The fault recovery process of step 75 proceeds to step 83 to determine the VNF instances that should be migrated as well as their respective backup hardware units and the migration methods.

The fault recovery process of step 75 then proceeds to step 84 and step 85 to migrate the VNF instances according to the fault recovery plan until all the VNF instances are migrated and their associated services are continued.

The fault recovery process of step 75 then reports (step 86) the current status, as well as the current location of the migrated VNF instances, to the fault recovery planning procedure to prepare a new recovery plan consistent with the newly created deployment of VNF instances, as well as to the deployment optimization procedure.

Figure 9:
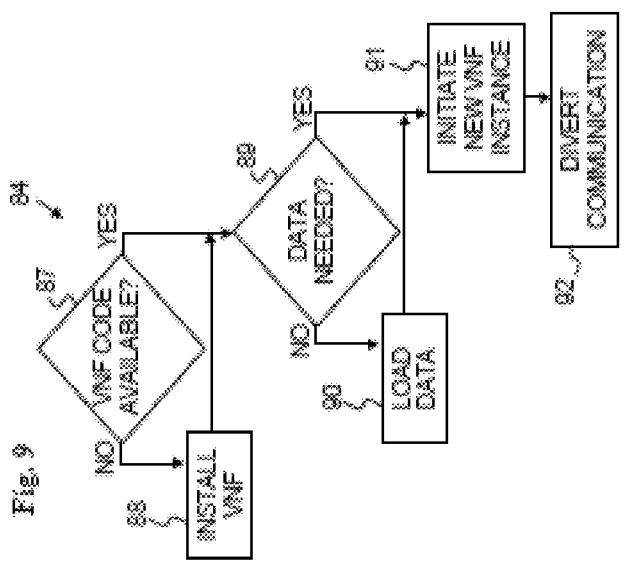
FIG. 9 is a simplified flow chart of a VNF migrating routine, in accordance with one embodiment.

Reference is now made to FIG. 9, which is a simplified flow chart of a VNF migrating routine as disclosed above with reference to step 84 of FIG. 8, and according to one embodiment.

The VNF migrating routine of step 84 starts with step 87 to determine if the required VNF code (e.g. a VNF) exists in the backup hardware unit. If the required VNF does not exist in the backup hardware unit the VNF migrating routine of step 84 (that is, process 77) proceeds to step 88 to install the required VNF in the backup hardware unit. If the VNF in the backup hardware unit requires particular to take over and/or continue the processing of the migrating VNF instance (step 89) such data is loaded (step 90) from the migrating VNF instance, or from a mirroring facility, or from a backup facility, or from any other database managed by the VNF-O. VNF migrating routine of step 84 then proceeds to step 91 to initiate in the backup hardware unit a VNF instance and configure it according to the parameters of the VNF instance of the first hardware unit. The VNF migrating routine of step 84 then proceeds to step 92 to divert all or part of the communication incoming to the VNF instance of the faulty hardware unit to the VNF instance of the backup hardware unit.

It is appreciated that the contents U.S. Provisional Patent Application No. 61/918,597, titled "System, Method, And Computer Program For Preserving Service Continuity In A Network Function Virtualization (NFV) Based Communication Networks", and U.S. patent application Ser. No. 14/572,716, now U.S. Pat. No. 9,384,028, titled "System, Method, And Computer Program For Preserving Service Continuity In A Network Function Virtualization (NFV) Based Communication Network" may form at least a part of a possible embodiment of step 84 of process 75 as described with reference to FIG. 8. It is appreciated that FIGS. 11 and 12 of U.S. patent application Ser. No. 14/572,716, now U.S. Pat. No. 9,384,028, titled "System, Method, And Computer Program For Preserving Service Continuity In A Network Function Virtualization (NFV) Based Communication Network" as well as their respective description, may be used instead of, or in addition to, FIG. 9 herein.

FIG. 10 illustrates a network architecture 1000, in accordance with one possible embodiment. As shown, at least one network 1002 is provided. In the context of the present network architecture 1000, the network 1002 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1002 may be provided.

Coupled to the network 1002 is a plurality of devices. For example, a server computer 1004 and an end user computer 1006 may be coupled to the network 1002 for communication purposes. Such end user computer 1006 may include a desktop computer, lap-top computer, and/or any other type of logic. Still yet, various other devices may be coupled to the network 1002 including a personal digital assistant (PDA) device 10011, a mobile phone device 1010, a television 1012, etc.

Figure 11:
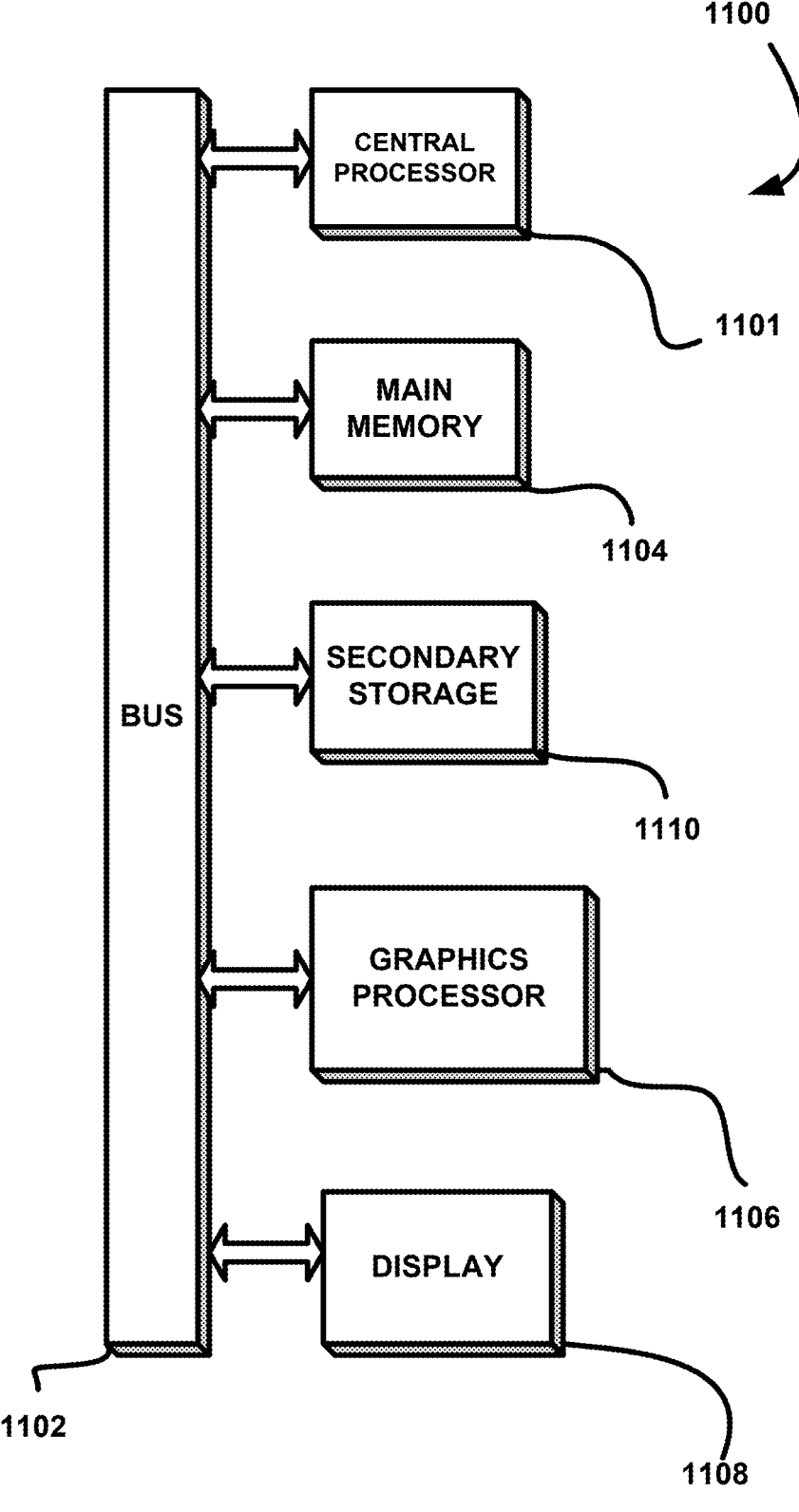
FIG. 11 illustrates an exemplary system, in accordance with one embodiment.

FIG. 11 illustrates an exemplary system 1100, in accordance with one embodiment. As an option, the system 1100 may be implemented in the context of any of the devices of the network architecture 1000 of FIG. 10. Of course, the system 1100 may be implemented in any desired environment.

As shown, a system 1100 is provided including at least one central processor 1101 which is connected to a communication bus 1102. The system 1100 also includes main memory 1104 [e.g. random access memory (RAM), etc.]. The system 1100 also includes a graphics processor 1106 and a display 1108.

The system 1100 may also include a secondary storage 1110. The secondary storage 1110 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1104, the secondary storage 1110, and/or any other memory, for that matter. Such computer programs, when executed, enable the system 1100 to perform various functions (as set forth above, for example). Memory 1104, storage 1110 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

identifying a first network component of a network function virtualization (NFV) based network, the first network component being a first hardware unit having one or more computer processors for executing a plurality of virtual network functions (VNFs);

selecting a plurality of second network components to be used for replacing the first network component in the NFV based network, based on a respective load of the plurality of second network components, the plurality of second network components each being a second hardware unit having one or more computer processors for executing one or more VNFs installed thereon;

installing duplicate instances of the plurality of VNFs across the plurality of second network components, including at least installing a duplicate instance of a first VNF of the plurality of VNFs on one second network component of the plurality of second network components, installing a duplicate instance of a second VNF of the plurality of VNFs on another second network component of the plurality of second network components, and creating at least two duplicate instances from a third VNF of the plurality of VNFs by splitting the third VNF into the at least two duplicate instances and distributing the least two duplicate instances across two or more second network components of the plurality of second network components.

2. The method of claim 1, wherein the plurality of second network components are selected in advance of a failure of the first network component.

3. The method of claim 1, wherein the plurality of second network components are selected responsive to a predicted failure of the first network component.

4. The method of claim 1, wherein the plurality of second network components are selected as part of a fault recover plan for the first network component.

5. The method of claim 1, further comprising:

securing at least one resource of each second network component of the plurality of second network components for use when replacing the first network component with the plurality of second network components.

6. The method of claim 5, wherein the at least one resource includes processing power, memory, or storage.

7. The method of claim 5, wherein securing the at least one resource of each second network component of the plurality of second network components prevents the at least one resource from being allocated to any other consumer.

8. The method of claim 7, wherein securing the at least one resource of each second network component of the plurality of second network components ensures availability of the at least one resource for use when the first network component fails and is replaced with the plurality of second network components.

9. The method of claim 1, wherein the duplicate instances of the plurality of VNFs are installed across the plurality of second network components responsive to a failure of the first network component.

10. The method of claim 1, wherein the duplicate instances of the plurality of VNFs are installed across the plurality of second network components in advance of a failure of the first network component.

11. The method of claim 1, further comprising:

configuring the plurality of second network components to mirror one or more aspects of the first network component.

12. The method of claim 11, wherein the one or more aspects include data associated with the first network component.

13. The method of claim 1, further comprising:

initiating the duplicate instances of the plurality of VNFs.

14. The method of claim 13, wherein the duplicate instances are initiated responsive to a failure of the first network component.

15. The method of claim 1, further comprising:

detecting a change in a load of at least one second network components of the plurality of second network components.

16. The method of claim 15, further comprising:

selecting at least one third network component to be used for replacing the first network component in the NFV based network, based on a respective load of the at least one third network component, the at least one third network component each being a third hardware unit having one or more computer processors for executing one or more VNFs installed thereon.

17. The method of claim 16, further comprising:

installing duplicate instances of the plurality of VNFs across the at least one third network component.

18. A non-transitory computer readable medium storing computer code executable by a computer processor to perform a method, the method comprising:

identifying a first network component of a network function virtualization (NFV) based network, the first network component being a first hardware unit having one or more computer processors for executing a plurality of virtual network functions (VNFs);

selecting a plurality of second network components to be used for replacing the first network component in the NFV based network, based on a respective load of the plurality of second network components, the plurality of second network components each being a second hardware unit having one or more computer processors for executing one or more VNFs installed thereon;

installing duplicate instances of the plurality of VNFs across the plurality of second network components, including at least installing a duplicate instance of a first VNF of the plurality of VNFs on one second network component of the plurality of second network components, installing a duplicate instance of a second VNF of the plurality of VNFs on another second network component of the plurality of second network components, and creating at least two duplicate instances from a third VNF of the plurality of VNFs by splitting the third VNF into the at least two duplicate instances and distributing the least two duplicate instances across two or more second network components of the plurality of second network components.

19. A system comprising:

a memory system; and one or more processing cores coupled to the memory system and that are each configured for:

identifying a first network component of a network function virtualization (NFV) based network, the first network component being a first hardware unit having one or more computer processors for executing a plurality of virtual network functions (VNFs);

selecting a plurality of second network components to be used for replacing the first network component in the NFV based network, based on a respective load of the plurality of second network components, the plurality of second network components each being a second hardware unit having one or more computer processors for executing one or more VNFs installed thereon;

installing duplicate instances of the plurality of VNFs across the plurality of second network components, including at least installing a duplicate instance of a first VNF of the plurality of VNFs on one second network component of the plurality of second network components, installing a duplicate instance of a second VNF of the plurality of VNFs on another second network component of the plurality of second network components, and creating at least two duplicate instances from a third VNF of the plurality of VNFs by splitting the third VNF into the at least two duplicate instances and distributing the least two duplicate instances across two or more second network components of the plurality of second network components.

* * * * *